United States Patent
Mehrotra et al.

(10) Patent No.: US 11,191,205 B2
(45) Date of Patent: Dec. 7, 2021

(54) PROCESSES FOR THE PREPARATION OF TREATED SEEDS

(71) Applicant: Monsanto Technology LLC, St. Louis, MO (US)

(72) Inventors: Vikram P. Mehrotra, Wildwood, MO (US); Sudabathula R. Rao, Wildwood, MO (US); Parker A. Smith, St. Louis, MO (US); Michaela H. Feiner, St. Louis, MO (US); Mark Miller, Lake St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 273 days.

(21) Appl. No.: 15/764,936

(22) PCT Filed: Sep. 30, 2016

(86) PCT No.: PCT/US2016/054673
§ 371 (c)(1),
(2) Date: Mar. 30, 2018

(87) PCT Pub. No.: WO2017/059197
PCT Pub. Date: Apr. 6, 2017

(65) Prior Publication Data
US 2018/0263173 A1    Sep. 20, 2018

Related U.S. Application Data

(60) Provisional application No. 62/236,518, filed on Oct. 2, 2015.

(51) Int. Cl.
*A01C 1/06*     (2006.01)
*A01N 25/08*    (2006.01)
*A01N 43/82*    (2006.01)

(52) U.S. Cl.
CPC ............... *A01C 1/06* (2013.01); *A01N 25/08* (2013.01); *A01N 43/82* (2013.01); *A01N 2300/00* (2013.01)

(58) Field of Classification Search
USPC .............. 47/57.6, DIG. 9, DIG. 11, 58.1 SE; 504/100
See application file for complete search history.

(56) References Cited

U.S. PATENT DOCUMENTS

| | | | |
|---|---|---|---|
| 2,967,376 A | | 1/1961 | Scott, Jr. |
| 4,368,591 A | * | 1/1983 | Barke ...................... A01C 1/00 504/100 |

(Continued)

FOREIGN PATENT DOCUMENTS

WO    2017/067833 A1    4/2017

OTHER PUBLICATIONS

Michelman Seed Coatings advertisement (2014), 1 page.
Smith, Pam, Bee Protected—New Product Controls Dust, The Progressive Farmer, Dec. 9, 2013, 1 page.

*Primary Examiner* — Andrea M Valenti
(74) *Attorney, Agent, or Firm* — Stinson LLP; Matthew Madsen

(57) ABSTRACT

Provided herein are processes for the preparation of treated seeds. Generally, the processes described herein comprise contacting a seed with a liquid seed treatment composition, thereby producing a wetted seed. The processes further comprise contacting the wetted seed with a dry powder comprising an effect pigment, thereby producing a treated seed having a coating comprising the effect pigment. In some instances, the treated seeds may exhibit an attractive visual appearance and good flowability through manufacturing, distribution, and planting equipment.

18 Claims, 14 Drawing Sheets

(56) References Cited

U.S. PATENT DOCUMENTS

| | | | |
|---|---|---|---|
| 4,448,796 A | 5/1984 | Wieser et al. | |
| 5,106,648 A | 4/1992 | Williams | |
| 5,137,747 A | 8/1992 | Malandain et al. | |
| 5,260,213 A | 11/1993 | Harman et al. | |
| 7,799,126 B2* | 9/2010 | Handrosch | C09C 1/0051 |
| | | | 106/482 |
| 9,380,739 B2* | 7/2016 | Jessop | A01C 1/06 |
| 2001/0036550 A1* | 11/2001 | Babler | A01C 1/06 |
| | | | 428/402 |
| 2003/0221365 A1* | 12/2003 | Babler | A01C 1/06 |
| | | | 47/57.6 |
| 2007/0207927 A1* | 9/2007 | Rosa | A01C 1/06 |
| | | | 504/100 |
| 2007/0298149 A1* | 12/2007 | Schweinfurth | C09C 1/0039 |
| | | | 426/250 |
| 2009/0143447 A1* | 6/2009 | Arthur | A01N 43/653 |
| | | | 514/370 |
| 2010/0267554 A1 | 10/2010 | Madsen et al. | |
| 2013/0273236 A1 | 10/2013 | Reineccius et al. | |
| 2015/0013221 A1 | 1/2015 | Jessop | |
| 2015/0072857 A1 | 3/2015 | Reichert et al. | |
| 2016/0345575 A1* | 12/2016 | Wiand | C09D 139/06 |
| 2017/0245494 A1* | 8/2017 | Bardosh | C08J 5/18 |

\* cited by examiner

PROCESSES FOR THE PREPARATION OF TREATED SEEDS

FIELD OF THE INVENTION

Provided herein are processes for the preparation of treated seeds.

BACKGROUND

Seed treatments can be used to apply a variety of agronomically important chemistries (e.g., agrochemicals that are useful to improve the agronomic characteristics of the seed and/or a plant grown from the seed) to seeds. However, seed treatment methods known in the art suffer from several problems.

Many seed treatments applied as coatings impart stickiness and/or tackiness to the seed surface. These surface characteristics can interfere with the flow of the seeds through industrial manufacturing and distribution equipment, which increases complexity and expense for the seed producer. For the same reason, seed treatments can also impede the flow of the seeds through planting equipment, which can result in planting errors and, ultimately, in lower crop yields.

In some cases, the flow of seeds through planting equipment can be improved by mixing the seeds with a flow aid, such as graphite or talc, in the field shortly before planting. This approach suffers from significant drawbacks, however, including the possible production of dust and the addition of further complexity to the planting process.

Due to the nature of conventional seed treatment formulations and the application methodology used industry-wide, treated seeds also often exhibit non-uniform coverage, blotchiness and in general do not have good visual appearance, often due to inconsistent adhesion of the coating to the seed surface, which results in poor shine and variations in color. Poor surface adhesion can also lead to rub-off of the coating, with a corresponding loss of active ingredients, further degradation of the visual appearance and potential production of unwanted dust during seed processing and planting.

It is therefore desirable to develop seed treatment methods that address these drawbacks. In particular, it is desirable to develop methods for the preparation of treated seeds having attractive visual appearance and good flowability through manufacturing, distribution, and planting equipment.

SUMMARY

A method of producing a treated seed is provided, the method comprising contacting a seed with a liquid seed treatment composition comprising a flowability agent, thereby producing a wetted seed; and subsequently contacting the wetted seed with a dry powder comprising an effect pigment, thereby producing a treated seed having a coating comprising the effect pigment.

A treated seed is provided, wherein the seed is produced using a method as described herein.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
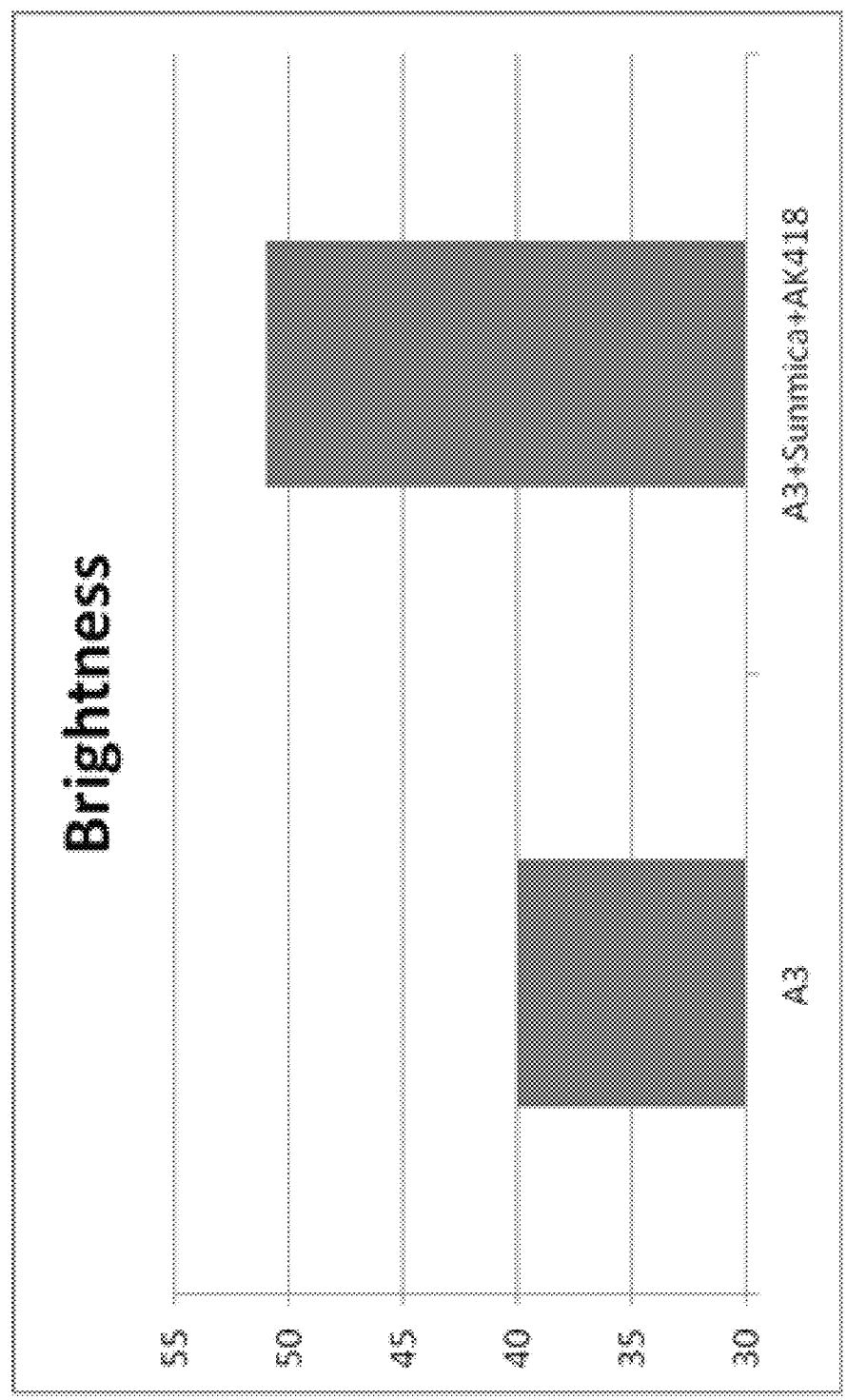
FIG. 1 is a graph of the brightness of treated seeds, as measured by the percent of reflected light, using the method described in Example 2.

Provided herein are processes for the preparation of treated seeds. Various embodiments of the process may enable the production of treated seeds having good flowability, desirable visual characteristics, or a combination thereof.

Generally, the processes described herein comprise contacting a seed with a liquid seed treatment composition, thereby producing a wetted seed. The processes further comprise contacting the wetted seed with a dry powder comprising an effect pigment, thereby producing a treated seed having a coating comprising the effect pigment.

Seed Treatment Compositions

In the processes described herein, a seed is contacted with a liquid seed treatment composition comprising one or more agrochemicals. The liquid seed treatment composition is typically in the form of a slurry, and may sometimes be referred to herein as a "seed treatment slurry."

In some instances, the liquid seed treatment composition comprises a flowability agent to improve the lubricity of the treated seeds. The flowability agent may comprise one or more liquid lubricants, solid lubricants, liquid emulsions, or suspensions of solid lubricants. Non-limiting examples of flowability agents include, for example, lubricants such as fats and oils, natural and synthetic waxes, graphite, talc, fluoropolymers (e.g., polytetrafluoroethylene), and solid lubricants such as molybdenum disulfide and tungsten disulfide.

In some instances, the flowability agent comprises a wax material. Non-limiting examples of wax materials that can be incorporated into the liquid seed treatment composition include plant and animal-derived waxes such as carnauba wax, candelilla wax, ouricury wax, beeswax, spermaceti, and petroleum derived waxes, such as paraffin wax. For example, in some instances, the flowability agent comprises carnauba wax.

In some instances, the flowability agent comprises an oil. For example, the flowability agent may comprise soybean oil.

Non-limiting examples of commercially available wax materials suitable for use as flowability agents include AQUAKLEAN 418 supplied by Micro Powders, Inc. (an anionic aqueous emulsion comprising extra light carnauba wax at 35% solids content).

The flowability agent can be incorporated into the liquid seed treatment composition through any means known in the art. For example, in some instances, flowability agent is in the form of an emulsion, wherein an organic phase comprising the flowability agent is dispersed throughout a continuous aqueous phase.

In some instances, the liquid seed treatment composition comprises a flowability agent and one or more agrochemicals that are useful to improve the agronomic characteristics of the seed and/or a plant grown from the seed. For example, the liquid seed treatment composition may comprise a liquid or solid lubricant material and one or more pesticides. Suitable pesticides include, but are not limited to, insecticides, nematicides, fungicides, and mixtures thereof.

Non-limiting examples of insecticides and nematicides include carbamates, diamides, macrocyclic lactones, neonicotinoids, organophosphates, phenylpyrazoles, pyrethrins, spinosyns, synthetic pyrethroids, tetronic and tetramic acids. For example, the liquid seed treatment composition may comprise one or more insecticides and nematicides selected from abamectin, aldicarb, aldoxycarb, bifenthrin, carbofuran, chlorantraniliprole, clothianidin, cyantraniliprole, cyfluthrin, cyhalothrin, cypermethrin, deltamethrin, dinotefuran, emamectin, ethiprole, fenamiphos, fipronil, flubendiamide, fosthiazate, imidacloprid, ivermectin, lambda-cyhalothrin, milbemectin, tioxazafen, nitenpyram, oxamyl, permethrin, spinetoram, spinosad, spirodichlofen, spirotetramat, tefluthrin, thiacloprid, thiamethoxam, tioxazafen, and thiodicarb.

In one embodiment, the insecticide or nematicide may be selected from the group consisting of clothianidin, thiamethoxam, tioxazafen, imidacloprid and combinations thereof.

In a preferred embodiment, the liquid seed treatment composition comprises tioxazafen.

Non-limiting examples of useful fungicides include aromatic hydrocarbons, benzimidazoles, benzothiadiazole, carboxamides, carboxylic acid amides, morpholines, phenylamides, phosphonates, quinone outside inhibitors (e.g. strobilurins), thiazolidines, thiophanates, thiophene carboxamides, and triazoles, Non-limiting examples of fungicides include acibenzolar-S-methyl, azoxystrobin, benalaxyl, bixafen, boscalid, carbendazim, chlorothalonil, cyproconazole, dimethomorph, epoxiconazole, fludioxonil, fluopyram, fluxapyroxad, fluoxastrobin, flutianil, flutolanil, fluxapyroxad, fosetyl-A1, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin, and triticonazole.

In one embodiment, the fungicide may be selected from the group consisting of prothioconazole, fluoxastrobin, ipconazole, silthiofam, metalaxyl, trifloxystrobin, pyraclostrobin, fluxapyroxad, sedaxane, fluopyram, mefenoxam, penflufen, azoxystrobin, and combinations thereof.

Additional agrochemical actives that may be incorporated into the liquid seed treatment composition include, for example, biological agents for pest control, microbial extracts, plant growth activators, and plant defense agents.

Non-limiting examples of biological agents include bacteria, fungi, beneficial nematodes, and viruses.

In certain embodiments, the biological agent can comprise a bacterium of the genus *Actinomycetes, Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comamonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovorax,* and *Xenorhabdus.* In particular embodiments the bacteria is selected from the group consisting of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Bradyrhizobium japonicum, Chromobacterium subtsugae, Metarhizium anisopliae, Pasteuria nishizawae, Pasteuria penetrans, Pasteuria usage, Pseudomonas fluorescens,* and *Streptomyces lydicus.*

In certain embodiments the biological agent can comprise a fungus of the genus *Alternaria, Ampelomyces, Aspergillus, Aureobasidium, Beauveria, Colletotrichum, Coniothyrium, Gliocladium, Metarhizium, Muscodor, Paecilomyces, Penicillium, Trichoderma, Typhula, Ulocladium,* and *Verticillium.* In another embodiment the fungus is *Beauveria bassiana, Coniothyrium minitans, Gliocladium vixens, Muscodor albus, Paecilomyces lilacinus, Penicillium bilaiaeTrichoderma asperellum, Trichoderma polysporum,* or *Trichoderma vixens.*

In further embodiments the biological agents can comprise harpin, *Reynoutria sachalinensis,* jasmonate, lipochitooligosaccharides, salicylic acid and/or isoflavones. In another embodiment, the biological agent may comprise *Bacillus firmus.*

Non-limiting examples of commercially available biological agents include REVV, CUE, QUICKROOTS, TORQUE, JUMPSTART, JUMPSTART LCO, ACTINOVATE, VOTIVO, CLARIVA, TAGTEAM, TAGTEAM LCO, OPTIMIZE, RATCHET, PROSTABLISH, NVELOP, SMILAX, CELL TECH, NITRAGIN, NITRAGIN GOLD, and MET 52, which are commercially available from Monsanto BioAg.

Generally, the liquid seed treatment compositions described herein can also comprise any adjuvants, excipients, or other desirable components known in the art. For example, in some embodiments, the treatment composition further comprises a surfactant.

Examples of anionic surfactants include alkyl sulfates, alcohol sulfates, alcohol ether sulfates, alpha olefin sulfonates, alkylaryl ether sulfates, arylsulfonates, alkylsulfonates, alkylaryl sulfonates, sulfosuccinates, mono- or diphosphate esters of polyalkoxylated alkyl alcohols or alkyl phenols, mono- or disulfosuccinate esters of alcohols or polyalkoxylated alkanols, alcohol ether carboxylates, phenol ether carboxylates. In one embodiment, the surfactant is an alkylaryl sulfonate.

Non-limiting examples of commercially available anionic surfactants include sodium dodecylsulfate (Na-DS, SDS), MORWET D-425 (a sodium salt of alkyl naphthalene sulfonate condensate, available from Akzo Nobel), MORWET D-500 (a sodium salt of alkyl naphthalene sulfonate condensate with a block copolymer, available from Akzo Nobel), sodium dodecylbenzene sulfonic acid (Na-DBSA) (available from Sigma Aldrich), diphenyloxide disulfonate, naphthalene formaldehyde condensate, DOWFAX (available from Dow), dihexylsulfosuccinate, and dioctylsulfosuccinate, alkyl naphthalene sulfonate condensates, and salts thereof.

Examples of non-ionic surfactants include sorbitan esters, ethoxylated sorbitan esters, alkoxylated alkylphenols, alkoxylated alcohols, block copolymer ethers, and lanolin derivatives. In accordance with one embodiment, the surfactant comprises an alkylether block copolymer.

Non-limiting examples of commercially available non-ionic surfactants include SPAN 20, SPAN 40, SPAN 80, SPAN 65, and SPAN 85 (available from Sigma Aldrich); TWEEN 20, TWEEN 40, TWEEN 60, TWEEN 80, and TWEEN 85 (available from Sigma Aldrich); IGEPAL CA-210, IGEPAL CA-520, IGEPAL CA-720, IGEPAL CO-210, IGEPAL CO-520, IGEPAL CO-630, IGEPAL CO-720, IGEPAL CO-890, and IGEPAL DM-970 (available from Sigma Aldrich); TRITON X-100 (available from Sigma Aldrich); BRIJ S10, BRIJ S20, BRIJ 30, BRIJ 52, BRIJ 56, BRIJ 58, BRIJ 72, BRIJ 76, BRIJ 78, BRIJ 92V, BRIJ 97, and BRIJ 98 (available from Sigma Aldrich); PLURONIC L-31, PLURONIC L-35, PLURONIC L-61, PLURONIC L-81, PLURONIC L-64, PLURONIC L-121, PLURONIC 10R5, PLURONIC 17R4, and PLURONIC 31R1 (available from Sigma Aldrich); Atlas G-5000 and Atlas G-5002L (available from Croda); ATLOX 4912 and ATLOX 4912-SF (available from Croda); SOLUPLUS (available from BASF); LANEXOL AWS (available from Croda); TRITON AG-98 (available from Rohm and Haas Co.); and Silwet L-77 (available from Momentive).

Non-limiting examples of cationic surfactants include mono alkyl quaternary amine, fatty acid amide surfactants, amidoamine, imidazoline, and polymeric cationic surfactants.

In some embodiments, the treatment composition comprises a co-solvent in addition to water. Non-limiting examples of co-solvents that can be used include ethyl lactate, methyl soyate/ethyl lactate co-solvent blends (e.g., STEPOSOL, available from Stepan), isopropanol, acetone, 1,2-propanediol, n-alkylpyrrolidones (e.g., the AGSOLEX series, available from ISP), a petroleum based-oil (e.g., AROMATIC series and SOLVESSO series available from Exxon Mobil), isoparaffinic fluids (e.g. ISOPAR series, available from Exxon Mobil), cycloparaffinic fluids (e.g. NAPPAR 6, available from Exxon Mobil), mineral spirits (e.g. VARSOL series available from Exxon Mobil), and mineral oils (e.g., paraffin oil).

Examples of commercially available organic solvents include pentadecane, ISOPAR M, ISOPAR V, and ISOPAR L (available from Exxon Mobil).

Typically, the liquid seed treatment composition is in the form of an aqueous slurry comprising one or more dispersed solid phases and a continuous aqueous phase. In some instances, the liquid seed treatment composition further comprises a dispersed liquid organic phase. For example, the composition may be in the form of an aqueous suspension concentrate.

In some embodiments, the process as described herein can be used in conjunction with previously formulated liquid seed treatment compositions, into which a flowability agent as described above has been incorporated.

Dry Powder Coating

In the processes described herein, a seed is contacted with a liquid seed treatment composition, thereby producing a wetted seed. The wetted seed is contacted with a dry powder comprising an effect pigment, thereby producing a treated seed having a coating comprising the effect pigment.

Effect pigments, which are sometimes also referred to in the art as "pearl pigments," are a class of materials that provide reflectivity, shine, and/or a pearlescent effect when applied as a coating. In some instances, the effect pigment is in the form of a powder comprising a substrate material and a metal oxide coating.

For example, the effect pigment may comprise a substrate material including but not limited to talc, silicate materials (e.g., mica), clay minerals, calcium carbonate, kaolin, phlogopite, alumina, and similar substances. In some instances, the substrate material comprises a hydrophilic material. The substrate material may be coated with a semi-transparent layer of a metal oxide, including but not limited to titanium dioxide, iron oxide, chromium oxide, or zirconium oxide.

Alternatively, in some instances, the effect pigment comprises metal powder or metal flakes. The metal powder or metal flakes may comprise a metal including, but not limited to aluminum, copper, silver, or bronze.

In some instances, the effect pigment comprises a silicate based substrate. Non-limiting examples of particulate silicates that can be incorporated into the dry powder coating include mica coated with titanium dioxide (e.g., SUNMICA FINE WHITE 2800102, which is commercially available from Sun Chemical Corp.). Other non-limiting examples of commercially available effect pigments that can be incorporated into the dry powder include MAGNA PEARL, LUMINA and MEARLIN pigments from BASF Corporation; PHIBRO PEARL from PhibroChem; and IRIDESIUM 120 from Aakash Chemicals.

In some instances, the dry powder has a mean particle size of from about 1 to about 25 microns.

The processes described herein provide several advantages over alternative processes wherein an effect pigment is incorporated directly into a liquid seed treatment composition. For example, when an effect pigment is added to a liquid seed treatment composition, it forms a dispersed solid phase that requires agitation, or the use of other techniques known in the art, to reduce settling and avoid sedimentation. The addition of an effect pigment to the liquid seed treatment composition can also result in increased viscosity, which can make pumping and spraying the composition more difficult.

Furthermore, because an effect pigment that is added to the liquid seed treatment composition will be distributed throughout the coating layer of the treated seed, rather than concentrated on its surface, more pigment must be added to the liquid composition to obtain the same increase in shine, reflectivity, and/or pearlescence of the treated seed.

The dry powder application step helps to rapidly dry the wetted seeds, which may prevent loss of the agrochemical active ingredient(s) applied as part of the liquid seed treatment composition and/or increase the flowability of the treated seeds through manufacturing and distribution equipment.

In some instances, the dry powder further comprises an agrochemical. For example, the dry powder may comprise a biological agent as described above. Incorporation of agrochemicals into the dry powder is advantageous, for example, because it can reduce the amount of water required to prepare the liquid seed treatment composition. In some instances, and as discussed below, a dry biological agent may be applied separately to the wetted seeds prior to application of the dry powder comprising an effect pigment.

Seeds and Plant Species

The seed treatment methods described herein can be used in connection with any species of plant and/or the seeds thereof. The methods are typically used in connection with seeds that are agronomically important. The seed may be a transgenic seed from which a transgenic plant can grow and incorporates a transgenic event that confers, for example, tolerance to a particular herbicide or combination of herbicides, increased disease resistance, enhanced tolerance to insects, drought, stress and/or enhanced yield. The seed may comprise a breeding trait, including for example, in one embodiment a disease tolerant breeding trait. In some instances, the seed includes at least one transgenic and breeding trait.

Application of the Liquid Seed Treatment Composition

Typically, the seed is contacted with the liquid seed treatment composition within a seed treatment apparatus. Suitable apparatuses and equipment for treating seeds are known in the art, and include, without limitation, batch treaters, continuous treaters, drum and pan coaters, and fluid bed coaters.

The liquid seed treatment composition can be applied to the seed by a variety of means, for example by a spray nozzle or revolving disc. In some instances, as the seed falls into the treatment apparatus, the seed is treated (for example by misting or spraying with the seed treatment composition) and passed through the treater under continual movement, tumbling, and/or agitation.

When coating seed on a large scale (for example a commercial scale), the liquid seed treatment composition may be applied using a continuous process, a batch process, or a semi-batch process.

Continuous Processes

When the liquid seed treatment composition is applied to the seeds using a continuous process, the seed treatment apparatus comprises a continuous seed treater. For example, in some instances, the liquid seed treatment composition is applied using a continuous process and the seed treatment apparatus comprises a horizontal cylindrical drum. During the seed treatment process, the seeds may be mixed by tumbling due to the rotating motion of the drum.

In some instances, the seeds are contacted with the liquid seed treatment composition in a liquid application zone before they enter a horizontal cylindrical drum. The liquid application zone can be, for example, a mixer, including but not limited to a conical mixer. In other instances, the seeds are contacted with the liquid seed treatment composition inside the horizontal cylindrical drum.

Batch Processes

Alternatively, the seed coating may be applied using a batch process. For example, a known weight of seeds can be introduced into the treatment equipment (such as a tumbler, a mixer, or a pan granulator). A known volume of the liquid seed treatment composition can be introduced into the treatment equipment at a rate that allows the seed treatment composition to be applied evenly over the seeds. During the application, the seed can be mixed, for example by spinning or tumbling.

When the liquid seed treatment composition is applied to the seeds using a batch process, the first seed treatment apparatus may be, for example, a batch treater. For example, in some instances, the liquid seed treatment composition is applied using a batch process and the seed treatment apparatus comprises a rotating bowl seed treater. In other instances, the liquid seed treatment composition is applied using a batch process and the seed treatment apparatus comprises a rotating drum treater.

In a further alternative embodiment, the liquid seed treatment composition may be applied using a semi-batch process that incorporates features from each of the batch process and continuous process embodiments set forth above.

Application of the Dry Powder Composition

The dry powder comprising an effect pigment can be applied to the wetted seed by a variety of means. For example, the dry powder may be applied using an auger feeder or a vibratory pipe feeder.

In some instances, the wetted seed is contacted with the dry powder within the same seed treatment apparatus used to apply the liquid seed treatment composition to the seed.

The powder should be added when the wetted seeds have a proper degree of surface wetness to promote good adhesion of powder to the surface. If the seeds are too wet when the powder is applied, the treated seeds will exhibit reduced shine, pearlescence, and/or reflectivity. On the other hand, if the seeds are allowed to become too dry before addition of the dry powder, the powder may not adhere properly to the surface of the seed, and the treated seeds may exhibit undesirable dust generation and might become too shiny.

The surface wetness of the wetted seeds can be routinely evaluated by those skilled in the art. For example, the surface wetness of the wetted seeds can be tested using a glove test, wherein a sample of wetted seeds taken from the treatment apparatus just before the dry powder application step is held in a light-colored latex glove. If the glove becomes significantly colored with residue from the wetted seeds, the process should be adjusted to provide the wetted seeds with more spin time (in the case of a rotating bowl seed treater) or residence time (in the case of a horizontal drum seed treater) before they are contacted with the dry powder.

Generally, there is a significant range of surface wetness where the dry powder application works satisfactorily, and an appropriate application point for the dry powder can be determined by one skilled in the art using routine experimentation.

Batch Processes

For example, in a batch process wherein the seed treatment apparatus is a rotating bowl treater, the dry powder comprising an effect pigment can be introduced into the rotating bowl after the liquid slurry application has been completed.

Often, it is desirable that the wetted seeds be dried or conditioned to ensure that they have an appropriate degree of surface wetness before application of the dry powder. This can be achieved, for example, by allowing the seeds to dwell in the rotating bowl for a conditioning period following application of the liquid treatment composition. For example, the dry powder may be added to the rotating bowl after a conditioning period of from about 2 seconds to about 1 minute, from about 5 seconds to about 30 seconds, or from about 5 seconds to about 20 seconds following the period in which the liquid seed treatment composition is added to the rotating bowl.

In some instances, after the dry powder has been added to the rotating bowl, the treated seeds are allowed to spin and/or tumble for a period of from about 5 seconds to about 60 seconds to ensure that the powder is uniformly distributed across the surface of the seeds.

Continuous Processes

In instances wherein the seed treatment apparatus is a continuous treater comprising a horizontal cylindrical drum, the dry powder may be applied to the seeds using, for example, an auger feeder or a vibratory pipe feeder.

Since the wetted seeds tend to dry as they traverse the length of the horizontal drum, the point at which powder is applied within the drum should be selected to ensure that the seeds at that location have an appropriate degree of surface wetness. More generally, it is desirable that the powder application point is adjustable along the length of the drum, in order to account for different liquid seed treatment formulations (e.g., comprising different agrochemicals and excipients) that require different amounts of liquid loading. For example, wetted seeds having a higher liquid loading can be accommodated by moving the powder application point further from the entrance to the drum, which increases the residence time prior to application of the dry powder and ensures that the powder will adhere properly to the seed surface. Conversely, wetted seeds having a lower liquid loading will require less conditioning time to achieve the desired surface wetness.

The tumbling action of the seeds within the horizontal drum should be sufficient to ensure that the treated seeds are uniformly coated with the dry powder once they reach the exit point of the drum. Those skilled in the art can adjust the dry powder application point within the horizontal drum to a range that achieves both of these objectives using routine experimentation.

For example, when the seed treatment apparatus is a continuous treater comprising a horizontal cylindrical drum, the wetted seeds are typically conditioned for a period of from about 5 seconds to about 2 minutes, from about 10 seconds to 1 minute, from about 10 seconds to about 40 seconds, or from about 15 seconds to about 30 seconds before being contacted with the dry powder.

Semi-Batch Processes

In some instances, the treated seeds may be prepared using a semi-batch process that incorporates two or more of the seed treatment apparatuses described above. For example, the liquid seed treatment composition may be applied using a batch process (e.g., using a rotating bowl seed treater) while the dry powder is applied using a continuous process (e.g., using a horizontal cylindrical drum). In other instances, the liquid seed treatment composition may be applied using a continuous process while the dry powder is applied using a batch process.

Additional Process Steps

The use of a single seed treatment apparatus for both the liquid and dry powder contacting steps can provide several advantages, including a reduction in process complexity and/or a reduction in capital equipment costs. In some instances, however, the process comprises one or more additional steps following application of the liquid seed treatment composition but before application of the dry powder.

For example, in some instances, the process further comprises the use of a drying apparatus to dry the wetted seeds. The use of a drying apparatus may be desirable, for example, in embodiments wherein a high application rate of the liquid seed treatment composition is required.

The drying apparatus may be incorporated into a continuous process, a batch process, or a semi-batch process that incorporates features from each of the batch process and continuous process embodiments set forth above. For example, the wetted seeds may be contacted with the dry powder within the drying apparatus (e.g., a tumbling dryer) once they have reached an appropriate level of surface wetness. In other instances, once the wetted seeds have been dried to the appropriate level of surface wetness, they are transferred to a second seed treatment apparatus wherein they are contacted with the dry powder. The second seed treatment apparatus can comprise any rotating device capable of gently mixing the seeds into contact with the dry powder, including but not limited to a rotating bowl seed treater, or a horizontal drum seed treater.

Dry Active Composition

In some instances, the process further comprises contacting the seed with a dry active composition comprising an agrochemical. The agrochemical can be, for example, a biological agent as described above.

In some instances, the process comprises contacting the seed with the dry active composition during the same period in which the seed is contacted with the liquid seed treatment composition. In other instances, the seed is contacted with the dry active composition after the seed has been contacted with the liquid seed treatment composition.

For example, in one embodiment, a dry active composition comprising a biological agrochemical is contacted with a seed at the same time or after the liquid seed treatment composition is contacted with the seed. In some instances, the dry active composition comprises a biological agrochemical selected from the group consisting of REVV, CUE, QUICKROOTS, TORQUE, JUMPSTART, JUMPSTART LCO, ACTINOVATE, VOTIVO, CLARIVA, TAGTEAM, TAGTEAM LCO, OPTIMIZE, RATCHET, PROSTABLISH, NVELOP, SMILAX, CELL TECH, NITRAGIN, NITRAGIN GOLD, and MET 52, which are commercially available from Monsanto BioAg.

Application Rates

Generally, the amount of the liquid seed treatment composition that is applied to the seed can vary depending on the seed weight to be coated, surface area of the seed, the concentration of the agrochemical(s) and/or other active ingredients in the liquid seed treatment composition, the desired concentration on the finished seed, the plant species, and the environment in which the seed is intended to be sown, among other factors.

Similarly, the amount of dry powder applied to the seed depends upon the process parameters, crop type and content of the liquid seed treatment composition, among other factors.

Typically, in the case of liquid or emulsified flowability agents, the flowability agent is applied in an amount of from about 0.2 fluid ounces (6 mL) to about 4 fluid ounces (118 mL) per 100 pounds (45 kg) of seed, or more typically from about 0.5 fluid ounces (14.8 mL) to about 4 fluid ounces (118 mL) per 100 pounds (45 kg) of seed (i.e., about 0.33 to about 2.6 mL/kg of seed).

When the seed is a corn seed or a soybean seed, the flowability agent is more typically applied in an amount of from about 0.5 fluid ounces (14.8 mL) to about 1.5 fluid ounces (44 mL) per 100 pounds (45 kg) of seed. When the seed is a cotton seed, the flowability agent is more typically applied in an amount of from about 1.5 fluid ounces (44 mL) to about 2.5 fluid ounces (74 mL) per 100 pounds (45 kg) of seed.

The dry powder comprising an effect pigment may be applied, for example, in an amount of from about 0.5 grams to about 5 grams per kilogram of seed.

Process Variables

Typically, the seed is contacted with the liquid seed treatment composition for a duration of less than about 2 minutes. For example, in some instances, the seed may be contacted with the liquid seed treatment composition for a duration of less than about 1 minute, less than about 45 seconds, less than about 30 seconds, or less than about 20 seconds. In this context, the term "contacting" refers to the period during which the liquid seed treatment composition is introduced into the seed treatment apparatus.

For example, when the seed is a corn seed or a soybean seed, the seed is typically contacted with the liquid seed treatment composition for an average duration of from about 45 seconds to about 90 seconds. When the seed is a cotton seed, it may be contacted with the liquid seed treatment composition for an average duration of from about 60 seconds to about 120 seconds.

Typically, the wetted seed is contacted with the dry powder for a duration of less than about 1 minute. For example, the wetted seed may be contacted with the dry powder for a duration of less than about 45 seconds, less than about 30 seconds, or less than about 20 seconds. In this context, the term "contacting" refers to the period during which the dry powder is introduced into the seed treatment apparatus.

For example, the wetted seed may be contacted with the dry powder for an average duration of from about 20 seconds to about 60 seconds.

When the process is a continuous process and the seed treatment apparatus comprises a continuous seed treater, the residence time of the seeds within the continuous seed treater is typically from about 30 seconds to about 4 minutes, from about 40 seconds to about 3 minutes, or from about 1 minute to about 2 minutes.

When the process is a batch process and the seed treatment apparatus comprises a rotating bowl seed treater, the total time spent by the seeds within the rotating bowl seed treater is typically from about 30 seconds to about 2 minutes, from about 45 seconds to about 75 seconds, or more typically about 60 seconds.

Having described the invention in detail, it will be apparent that modifications and variations are possible without departing from the scope of the invention defined in the appended claims.

EXAMPLES

The following non-limiting examples are provided to further illustrate the present invention.

Example 1: Preparation of the Liquid Seed Treatment Composition and Treated Seeds Unless otherwise noted, the following procedure was used to prepare the liquid seed treatment compositions used, respectively, in each of the following examples.

If any component of the seed treatment composition was provided in the form of a liquid suspension or slurry, a model 6010 EBERBACH shaker was used to agitate the component until all solids were suspended.

If the total volume of the liquid treatment composition required to carry out the experiment was 50 mL or less, each component of the composition was then combined in a centrifuge tube and mixed on a Model G560 VORTEX-GENIE 2 at a speed of 10 until the resulting slurry was homogenous.

Alternatively, if the total volume of the liquid treatment composition required to carry out the experiment was greater than 50 mL, the components were combined in a glass beaker, set on a CORNING PC-420D stir plate, and stirred with a stir bar for 30 minutes at a speed just enough to create a vortex.

Unless otherwise noted, the following procedure was used to prepare treated seeds used, respectively, in each of the following examples.

Seeds were added to a model 11 WINTERSTEIGER HEGE rotating bowl seed treater. After the treater reached full speed (1600 rpm), the liquid seed treatment composition was added for a duration of 8 seconds, at a flow rate necessary to achieve the desired loading. At 15 seconds from the start of the treatment cycle (i.e., 7 seconds after completing the liquid seed treatment addition), the dry powder was added to the rotating bowl. The seeds were spun for an additional 15 seconds and discharged, providing a total treatment cycle time of 30 seconds.

In the seed treatment formulations described below, A1 refers to a commercially available fungicide seed treatment formulation; A3 refers to a commercially available fungicide+insecticide seed treatment formulation; and A7 refers to a commercially available fungicide+insecticide+nematicide seed treatment formulation. AK418 refers to AQUAKLEAN 418, an anionic aqueous emulsion comprising extra light Carnauba wax at 35% solids content, supplied by Micro Powders, Inc. SM refers to SUNMICA, an effect pigment supplied by Sun Chemical Corp. F refers to a commercially available fungicide composition. PS refers to PROSTABLISH, a commercially available seed treatment supplied by Monsanto BioAg. SO refers to soybean oil.

As used in the examples below, the term "UTC" stands for "untreated control," and refers to untreated seeds. The term "fb" stands for "followed by."

Example 2: Brightness Test

Treated seeds were prepared using the procedure set forth in Example 1 above, and placed in a seed tray.

The seeds were then loaded onto an imaging platform with a blue background for image acquisition. A combination of backlighting and overhead lighting was used to reliably separate the seeds from the background and provide sufficient illumination for high quality images. The seed images were acquired with an area scan RGB camera (NIKON D7100) with the same illumination conditions. Prior to image acquisition, manual manipulations were performed to spread the seeds in the tray such that they were in a monolayer on the surface and not physically touching one another. Seed areas were separated from background and RGB values of the pixels of each seed were extracted with image processing in MATLAP (version 2014b). The color and brightness of each seed was calculated by averaging all pixels of each seed.

As shown in FIG. 1, seeds coated with a combination of A3, AK418, and SUNMICA reflected more light than seeds coated with A3 alone.

Example 3: FT4 Flowability Tests

Treated seeds were prepared using the procedure set forth in Example 1 above, and were dried at ambient temperature and humidity overnight.

The flowability of the seeds were measured using an FT4 powder rheometer with a 23.5 mm blade and a C2031 50 mm/160 mL borosilicate glass vessel No. 7762. The FT4 powder rheometer was used to measure the basic flowable energy (BFE) of each sample. BFE refers to the energy (in mJ) required to turn and move the probe through a column of the seeds, and is a measure of the flowability of the seeds. The less energy required to complete the test, the better (more easily) the seeds flowed.

Each experimental trial utilized one conditioning run followed by seven measured runs. The BFE of each sample was determined by averaging runs four through seven, allowing runs one to three to be extra conditioning runs in addition to the one conditioning run previously programmed in. After the built in conditioning run, the column of seed was split so that a known and consistent 160 mL volume of seed was used.

Table 3A provides a detailed description of the treatments applied to the seeds. Table 3B lists the flowability data (BFE in mJ) that were obtained for each seed treatment as applied to two varieties of soybean seeds (Variety 1 and Variety 2).

TABLE 3A

Seed Treatments

| Treatment # | Treatment description |
|---|---|
| 1 | UTC |
| 2 | A3 |
| 3 | A3 + 1 fl oz (30 mL) AK418 fb 1.0 g/kg SM |
| 4 | A3 fb graphite when dry |

Table 3B lists the flowability data that were obtained for each seed treatment as applied to two varieties of soybean seeds (Variety 1 and Variety 2).

TABLE 3B

Flowability Data

| Treatment # | Variety 1 BFE (mJ) | Variety 2 BFE (mJ) |
|---|---|---|
| 1 | 224.77 | 170.33 |
| 2 | 400.63 | 271.74 |
| 3 | 190.11 | 158.97 |
| 4 | 199.52 | 171.01 |

Figure 2:
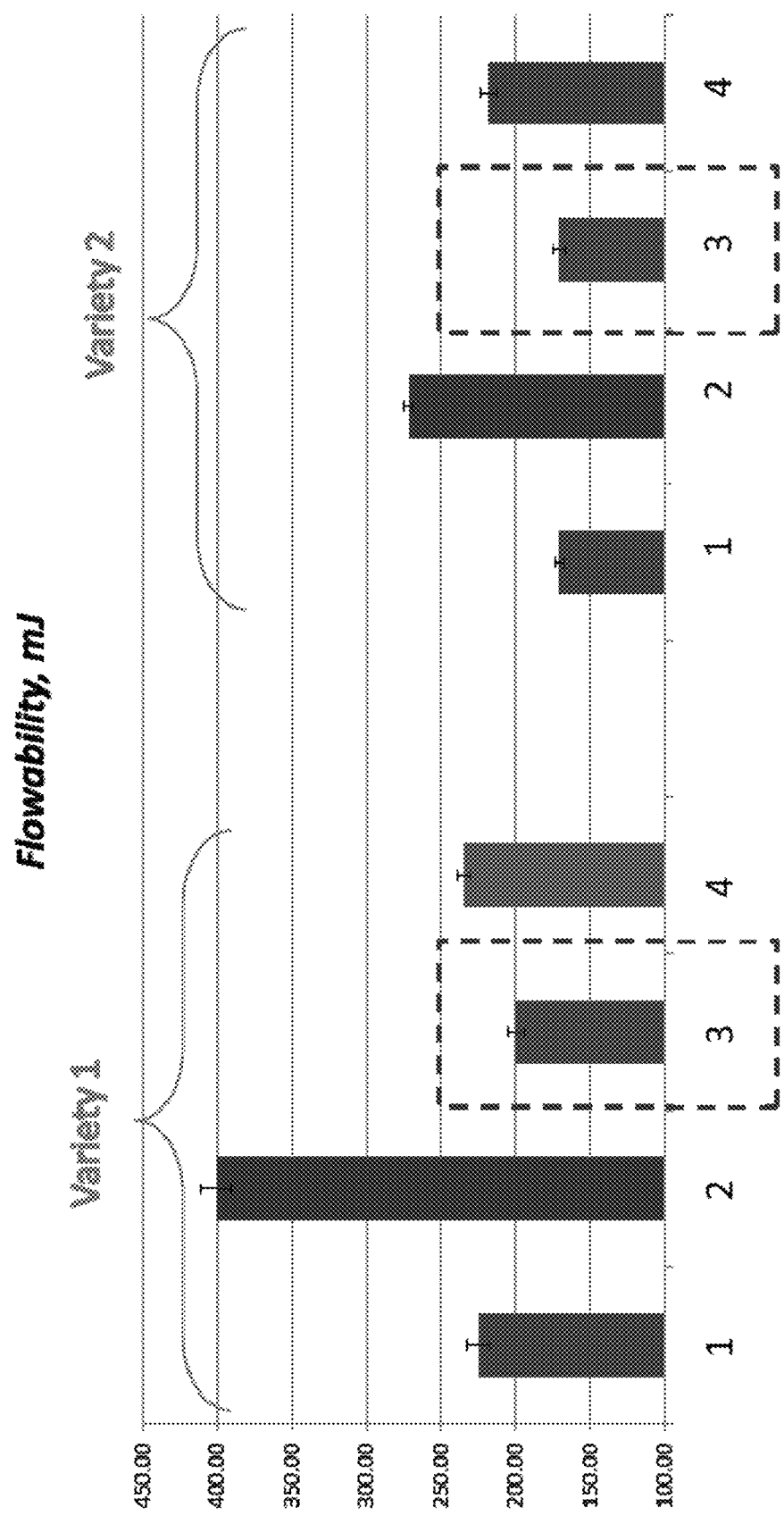
FIG. 2 is a graph of the basic flowable energy (in mJ) of treated seeds measured using the FT4 method described in Example 3. Lower bars indicate that less energy was required to complete the test, and indicate that the seeds exhibit increased flowability.

As shown in FIG. 2, seeds coated with A3, AK418, and SUNMICA exhibited improved flowability relative to the A3-only standard.

Seeds coated with formulations consisting of A3, AK418, and SUNMICA provided greater flowability not only as compared to A3-only standards but also as compared to the untreated control. Seeds coated with A3, AK418, and SUNMICA were even more flowable than seeds coated with A3 followed by the addition of graphite, which simulates the current planting practices.

Example 4: Wet Flowability Test Methods

Wet flowability experiments were performed using the procedure set forth in Example 3 above, except that the seeds were transferred directly from the seed treater to the FT4 powder rheometer immediately after completion of the seed treatment process (i.e., with minimal drying time).

Figure 3:
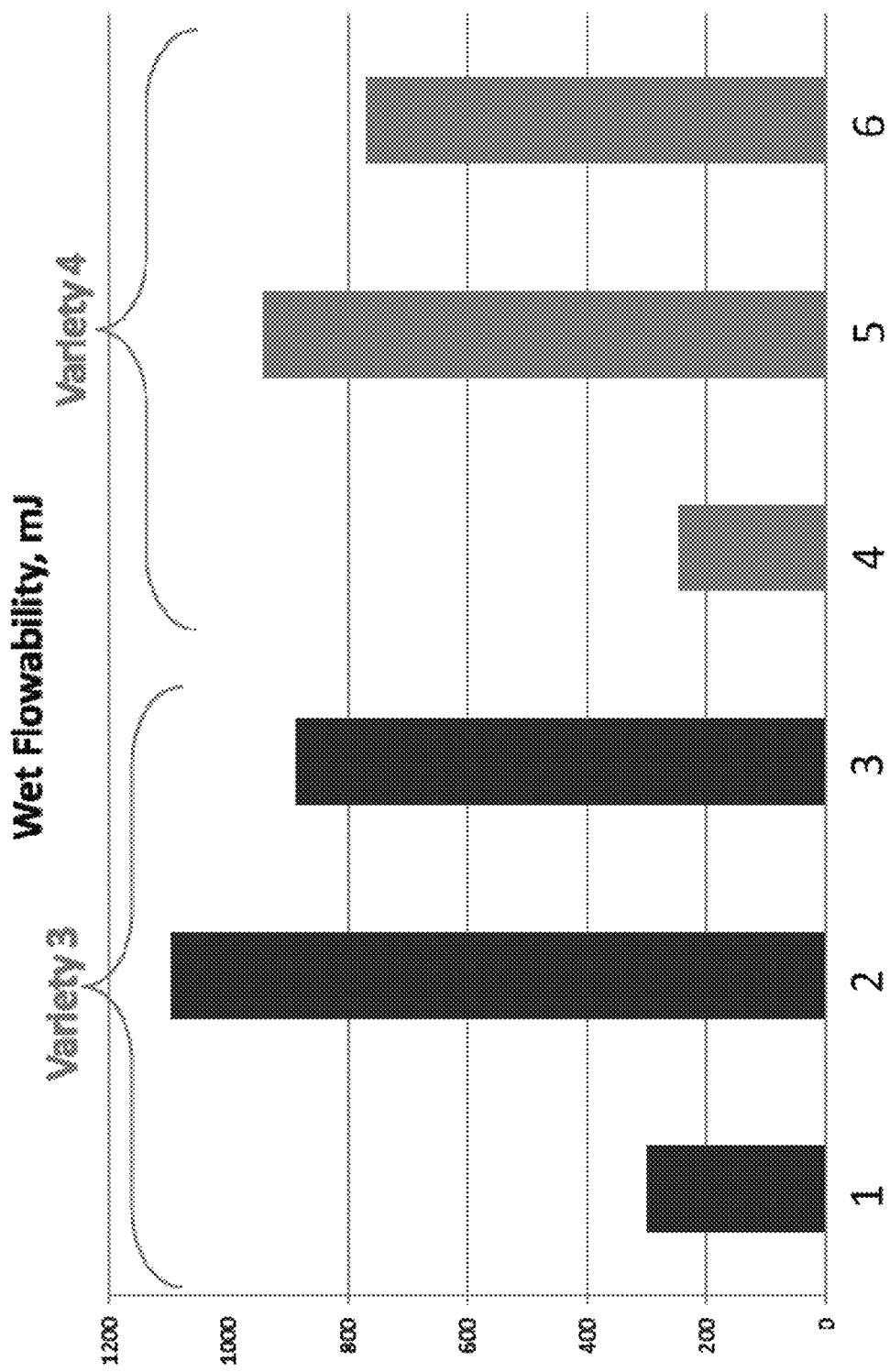
FIG. 3 is a graph of the flowability of treated seeds measured using the FT4 method described in Example 4.

Two varieties of soybeans were tested (Variety 3 and Variety 4) with a variety of seed treatments. A description of each seed treatment formulation used in this example is provided in Table 4A below. The data from the wet flowability experiments are summarized in Table 4B, below. A summary of the data is also depicted in FIG. 3.

TABLE 4A

Seed Treatments

| Treatment # | Variety | Description |
|---|---|---|
| 1 | 3 | UTC |
| 2 | 3 | A3 |
| 3 | 3 | A3 + PS + AK418 + F + SM |
| 4 | 4 | UTC |
| 5 | 4 | A3 |
| 6 | 4 | A3 + PS + AK418 + F + SM |

TABLE 4B

Flowability Data

| Treatment # | BFE (mJ) |
|---|---|
| 1 | 298.83 |
| 2 | 1095.67 |
| 3 | 887.15 |
| 4 | 248.46 |
| 5 | 941.88 |
| 6 | 770.07 |

The combination of A3, PS, and F produces a very sticky and wet formulation having poor flowability. With the addition of a dry powder comprising SUNMICA, however, the combined formulation exhibits better flowability than the A3-only baseline treatment.

Example 5: Plantability Testing

Soybean seeds (Variety 3) were prepared using the procedure set forth in Example 1 above. A description of each seed treatment formulation used in this example is provided in Table 5A below.

TABLE 5A

Seed Treatments

| Treatment # | Description |
|---|---|
| 1 | A3 |
| 2 | A3 + PS + AK418 fb 1 g/kg SM |
| 3 | A3 + PS + AK418 fb 0.5 g/kg SM |
| 7 | A3 + PS + SO fb 0.5 g/kg SM |
| 8 | A3 + PS |

Plantability experiments were performed at a field test site in the United States. The JOHN DEERE Vacumeter was equipped with a 108 cell soybean seed disk spinning at 87 rpm and a vacuum level of 8 inches (20.3 cm). The disk rotated 10 times during each experimental trial, which should have picked up 1080 seeds.

The treated seeds were run through the planting equipment, without additives such as talc or graphite. Tests were conducted at both standard temperature and humidity and at a higher temperature (30° C.) and humidity (85%), which represent more challenging conditions for seed planting.

The planted seeds were then evaluated to determine how many were successfully planted. Each planting location having a single planted seed was deemed to be successful; planting locations having either no seeds or multiple seeds were deemed to be unsuccessful.

Under standard temperature and humidity conditions, there was no significant difference in plantability (all tests resulted in a measured plantability greater than 90%). The results presented in Table 5B below indicate the percentage of each target seed population that was successfully planted under the high temperature, high humidity conditions.

TABLE 5B

| Percentage of target seed population planted | |
|---|---|
| Treatment # | % Seeds planted |
| 1 | 28.3 |
| 2 | 74.3 |
| 3 | 65.0 |
| 7 | 66.3 |
| 8 | 45.8 |

Figure 4:
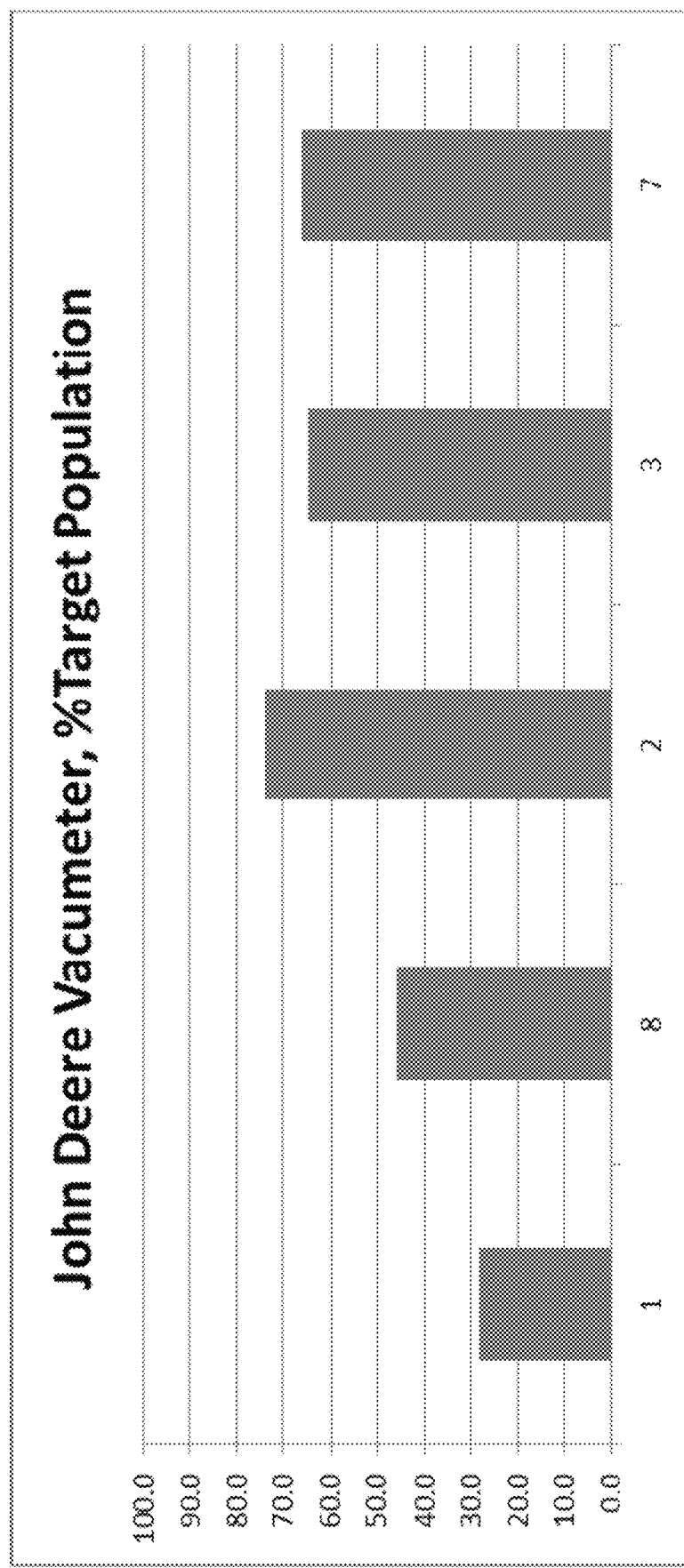
FIG. 4 depicts the percentage of the target seed population that was successfully planted with a JOHN DEERE Vacumeter using the procedure described in Example 5.

When soybeans were planted using a JOHN DEERE Vacumeter under high temperature and humidity conditions, the seeds coated with AK418 and SUNMICA lessened the impact of the extreme testing conditions on plantability. See FIG. 4.

Example 6: Flowability Testing

Additional experimental trials were performed on five varieties of soybean seeds. The treated seeds were prepared using the procedure set forth in Example 1 above. A description of each seed treatment formulation used in this example is provided in Table 6A below.

TABLE 6A

| Seed Treatments | |
|---|---|
| Treatment # | Description |
| 1 | A3 |
| 2 | A3 + PS + AK418 fb 1 g/kg SM |
| 3 | A3 + PS + AK418 fb 0.5 g/kg SM |
| 7 | A3 + PS + SO fb 0.5 g/kg SM |
| 8 | A3 + PS fb graphite when dry |
| 9 | A3 + PS fb talc when dry |
| 10 | A3 + PS |
| 11 | A3 + PS + AK418 |
| 12 | A1 + PS + AK418 fb 1 g/kg SM |
| 13 | A7 + 0.7 fl oz (21 mL) water + PS + AK418 fb 1 g/kg SM |

Flowability measurements were performed using the procedure set forth in Example 3 above. Table 6B lists the BFE (in mJ) for all five seed varieties coated with the seed treatment formulations listed in Table 6A above.

TABLE 6B

| Flowability Measurements BFE (mJ) | | | | | | |
|---|---|---|---|---|---|---|
| | Variety | | | | | |
| Treatment # | 3 | 4 | 2 | 5 | 6 | Average |
| 1 | 262.5 | 308.1 | 295.0 | 365.0 | 327.5 | 311.6 |
| 2 | 157.0 | 177.8 | 193.6 | 193.6 | 181.3 | 180.7 |
| 3 | 164.7 | 169.0 | 183.4 | 182.4 | 171.8 | 174.2 |
| 7 | 264.2 | 199.4 | 225.2 | 254.7 | 203.0 | 229.3 |
| 8 | 234.2 | 200.8 | 198.7 | 220.3 | 194.2 | 209.7 |
| 9 | 212.3 | 204.2 | 197.2 | 200.5 | 184.0 | 199.7 |
| 10 | 321.9 | 314.3 | 276.4 | 387.5 | 298.3 | 319.7 |
| 11 | 172.5 | 173.0 | 185.0 | 184.2 | 164.6 | 175.9 |
| 12 | 165.5 | | | | | 165.5 |
| 13 | 184.1 | | | | | 184.1 |

Figure 5:
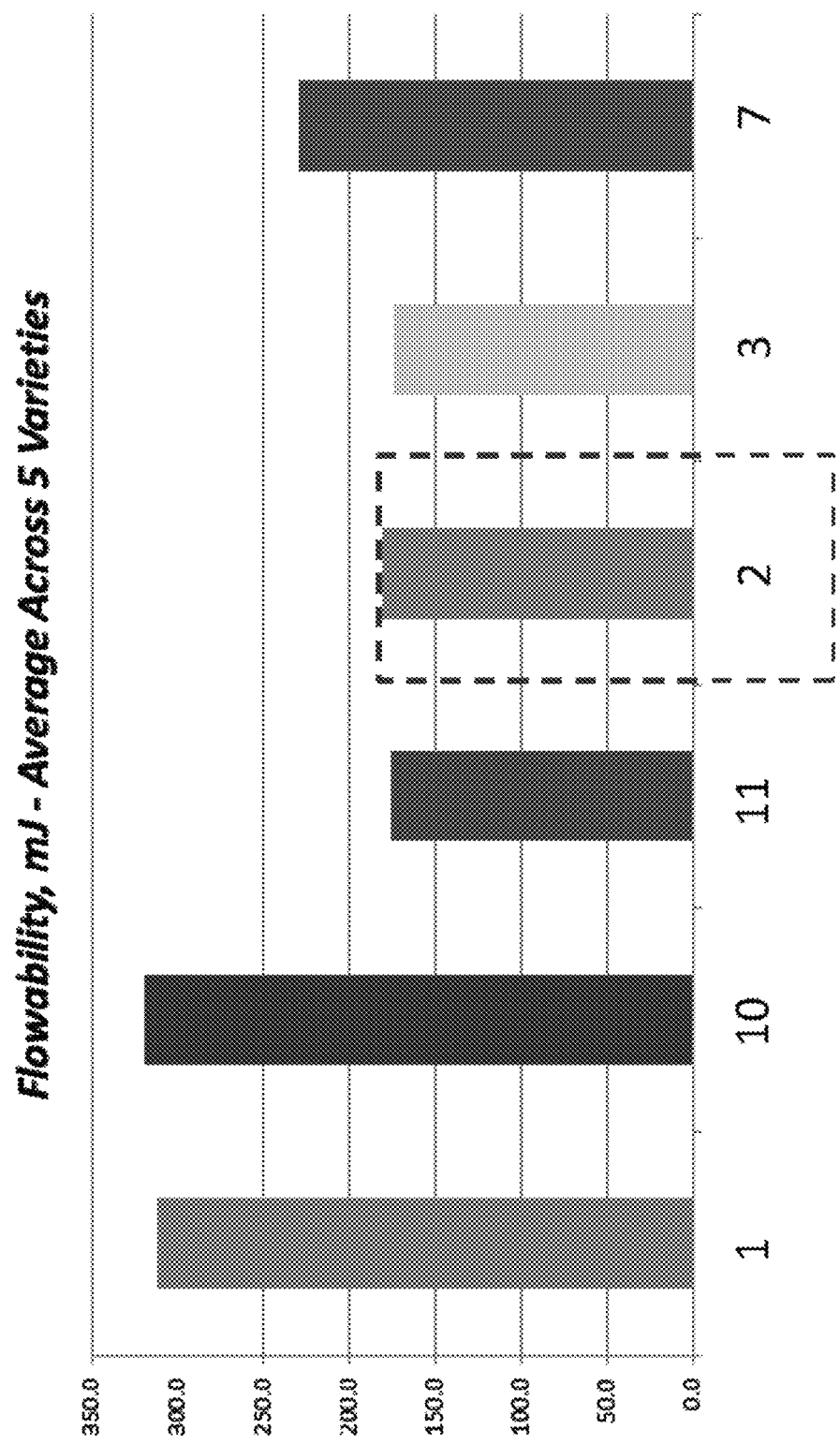
FIG. 5 is a graph of the flowability of treated seeds measured using the FT4 method described in Example 6.
Figure 6:
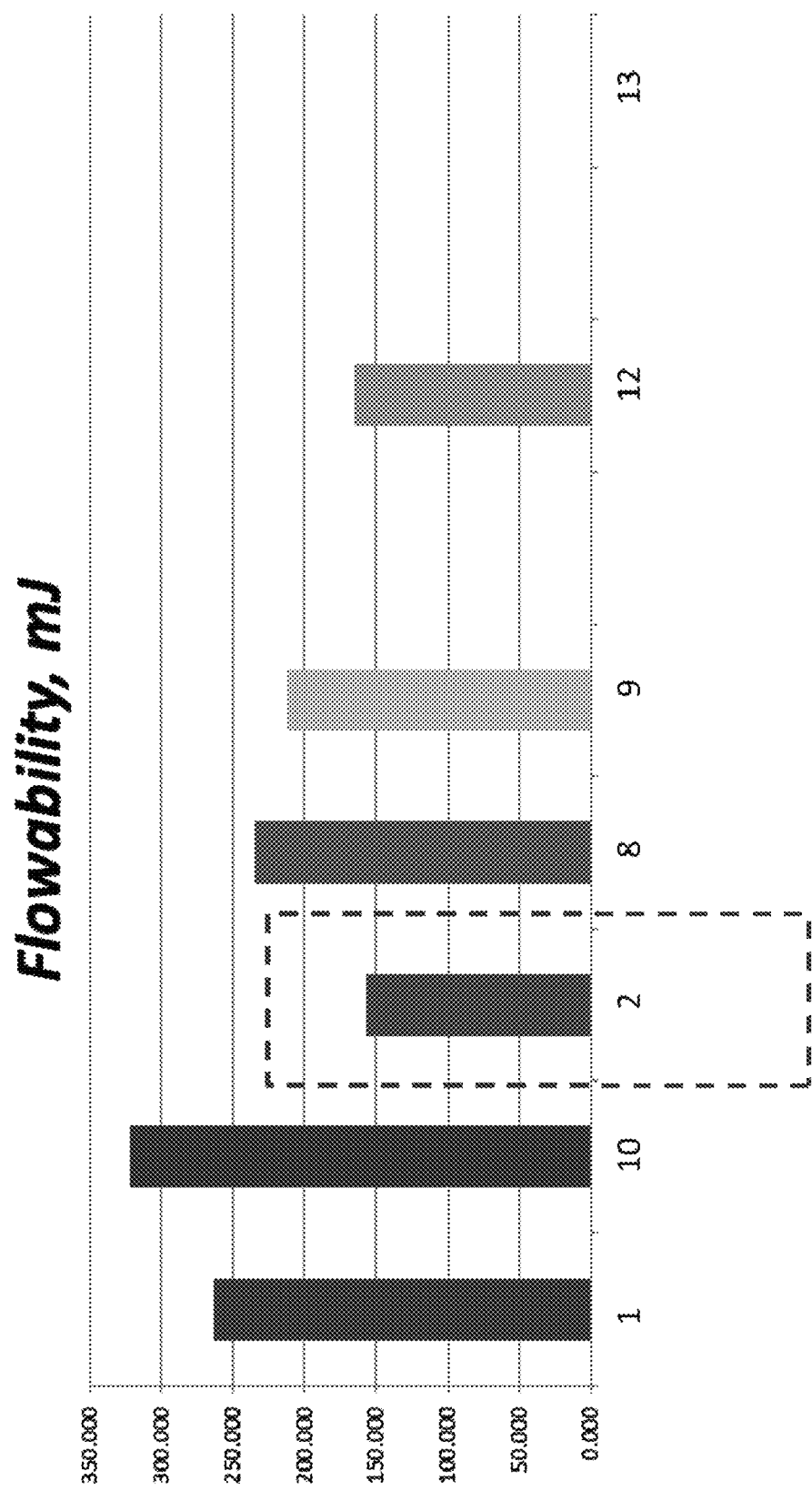
FIG. 6 is a graph of the flowability of treated seeds measured using the FT4 method described in Example 6.

These data are also summarized in FIGS. 5 and 6. Generally, seed treatments comprising a flowability agent (e.g., AK418 or soy oil) and a dry powder coating (e.g., SUNMICA) provided improved flowability relative to comparative seed treatments.

Example 7: Flowability Testing for Expanded Soybean Study

Additional experimental trials were performed on four varieties of soybean seeds (Variety 2, Variety 3, Variety 4 and Variety 5). The treated seeds were prepared using the procedure set forth in Example 1 above. A description of each seed treatment formulation prepared for this example is provided in Table 7A below.

TABLE 7A

| Seed Treatments | |
|---|---|
| Treatment # | Description |
| 1 | UTC |
| 2 | A3 |
| 3 | A3 + 0.5 fl oz (15 mL)/cwt PS + F |
| 4 | A3 + 0.5 fl oz (15 mL) PS + 1 fl oz (30 mL) AK418 + F fb 1.25 g/kg SM |
| 5 | A1 |
| 6 | A1 + PS 0.5 fl oz(15 mL)/cwt + F |
| 7 | A1 + 0.5 fl oz (15 mL) PS + 1 fl oz (30 mL) AK418 + F fb 1.25 g/kg SM |
| 8 | A7 |
| 9 | A7 + 0.5 fl oz (15 mL)/cwt PS + F |
| 10 | A7 + 0.5 fl oz (15 mL) PS + 1 fl oz (30 mL) AK 418 + F fb 1.25 g/kg SM |

Figure 7:
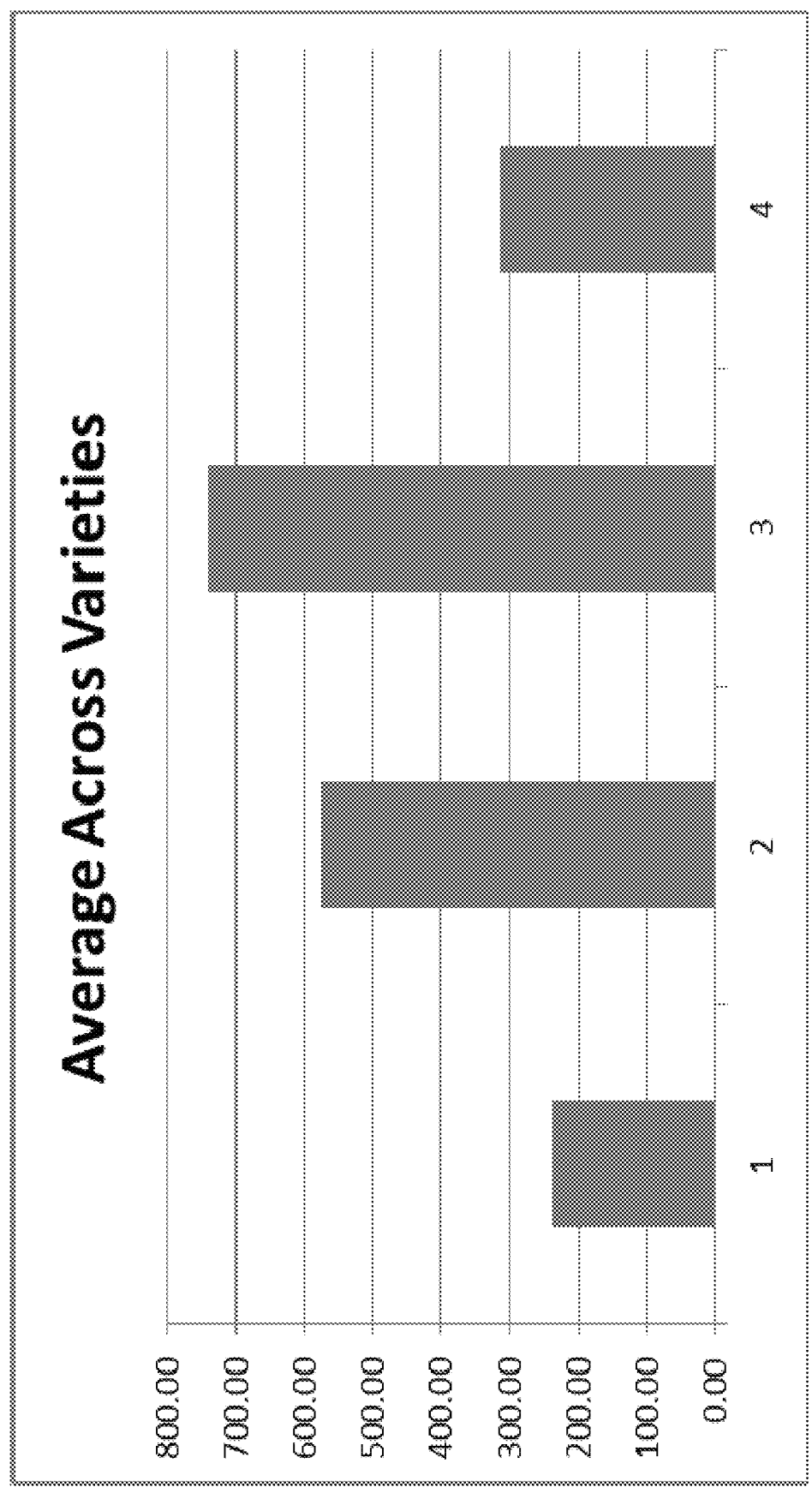
FIG. 7 is a graph of the flowability of four varieties of treated seeds measured using the FT4 method described in Example 7.

The treated seeds were then evaluated for flowability using the procedure set forth in Example 3 above. The resulting data are provided in Table 7B below. The average flowability of each treatment across all four seed varieties is visually depicted in FIG. 7.

TABLE 7B

| Flowability | | |
|---|---|---|
| Treatment # | Variety | BFE (mJ) |
| 1 | 3 | 297.95 |
| 2 | 3 | 715.57 |
| 3 | 3 | 830.93 |
| 4 | 3 | 319.35 |
| 1 | 4 | 245.25 |
| 2 | 4 | 479.47 |
| 3 | 4 | 776.09 |
| 4 | 4 | 297.83 |
| 1 | 2 | 175.54 |
| 2 | 2 | 342.67 |
| 3 | 2 | 441.99 |
| 4 | 2 | 316.98 |
| 1 | 5 | 232.98 |
| 2 | 5 | 758.84 |
| 3 | 5 | 911.11 |
| 4 | 5 | 324.83 |

Example 8: Glove Wetness Tests for Expanded Soybean Study

Treated seeds were prepared using the seed treatments described in Example 7 and presented in Table 7A above.

The glove wetness tests were designed to measure the surface wetness of the treated seed at the moment it is discharged from the treatment apparatus. To conduct the test, the operator grabbed a handful of treated seeds while wearing a blue powder free 7500PFL BEST NITRILE disposable nitrile glove at the moment of discharge form the treater. The seeds were held for about 2 seconds with a consistent force each time and then released. If the treatment formulation was not sufficiently dry, at least a portion of the treatment formulation would be transferred from the seed to the surface of the glove. After the seeds were released, the size and intensity of the spots on the glove was given a rating from 0 (no spots) to 9 (many dark spots). The resulting data are listed in Table 8 below.

TABLE 8

Glove Wetness

| Treatment # | Variety | Glove Wetness Value |
|---|---|---|
| 1 | 3 | 0 |
| 2 | 3 | 8 |
| 3 | 3 | 9 |
| 4 | 3 | 2 |
| 5 | 3 | 5 |
| 6 | 3 | 7 |
| 7 | 3 | 1 |
| 8 | 3 | 7 |
| 9 | 3 | 9 |
| 10 | 3 | 4 |
| 1 | 4 | 0 |
| 2 | 4 | 5 |
| 3 | 4 | 7 |
| 4 | 4 | 3 |
| 5 | 4 | 1 |
| 6 | 4 | 5 |
| 7 | 4 | 1 |
| 8 | 4 | 7 |
| 9 | 4 | 9 |
| 10 | 4 | 4 |
| 1 | 7 | 0 |
| 2 | 7 | 9 |
| 3 | 7 | 9 |
| 4 | 7 | 5 |
| 1 | 5 | 0 |
| 2 | 5 | 7 |
| 3 | 5 | 9 |
| 4 | 5 | 2 |

Figure 8A:
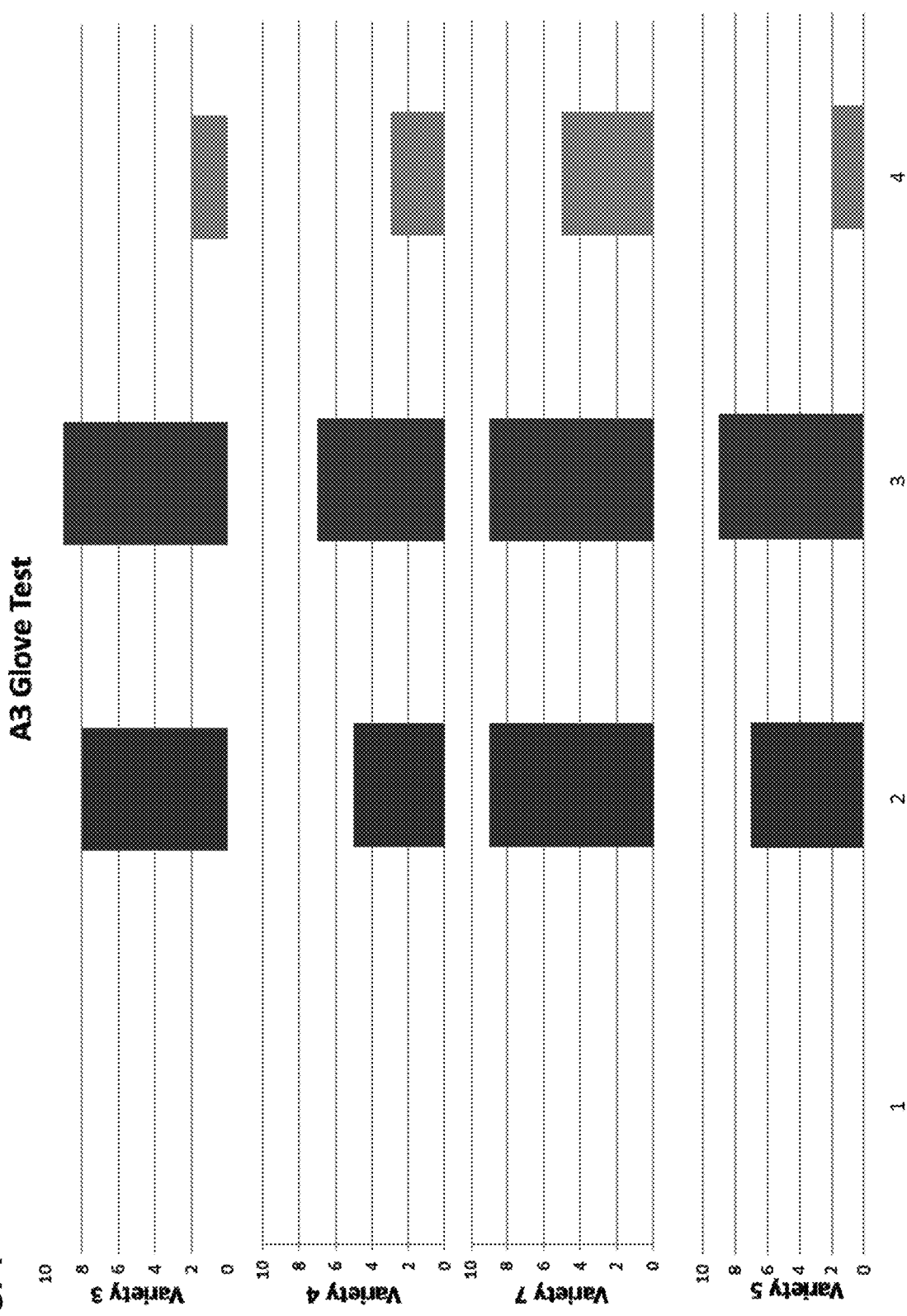
FIGS. 8A, 8B, and 8C depict the surface wetness of various treated seeds measured using the glove test procedure described in Example 8.
Figure 8B:
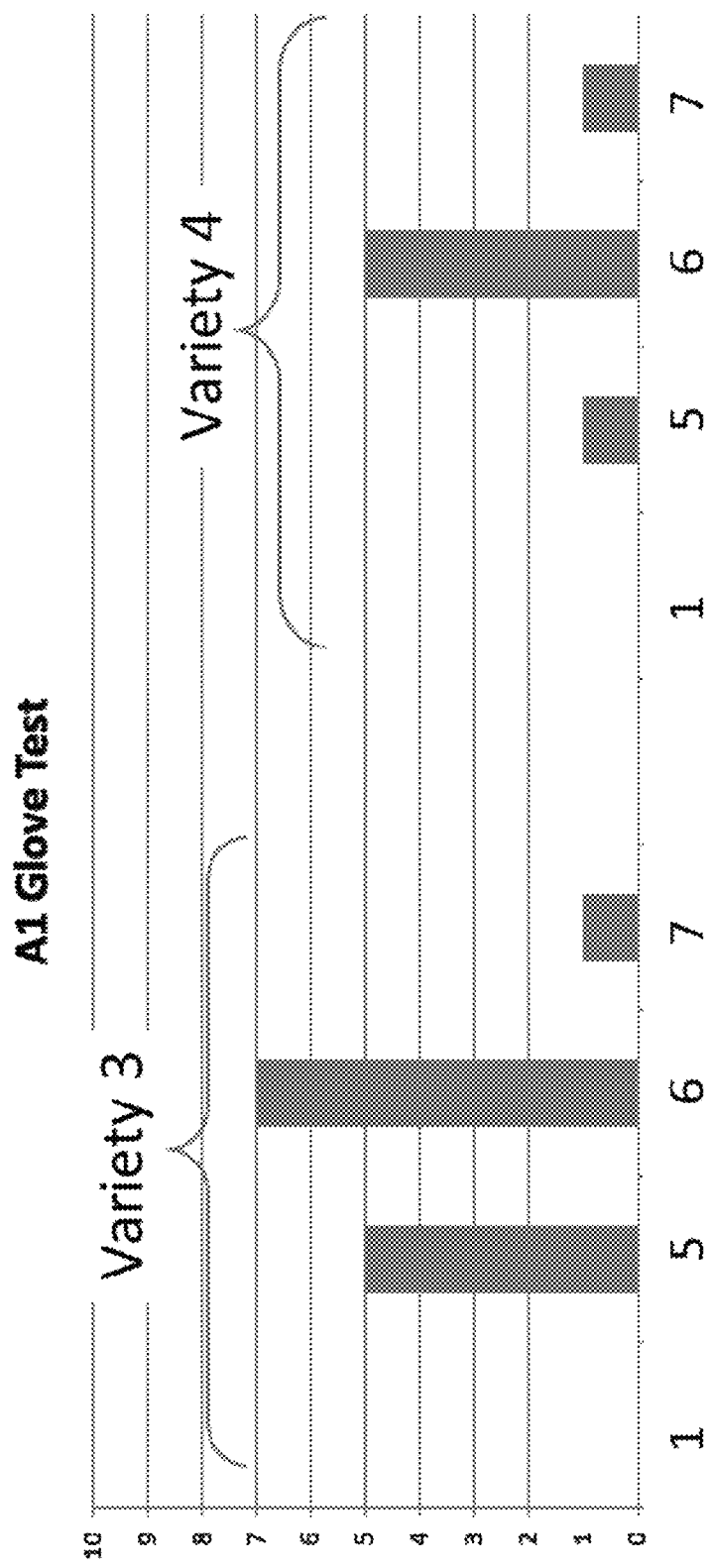
Figure 8C:
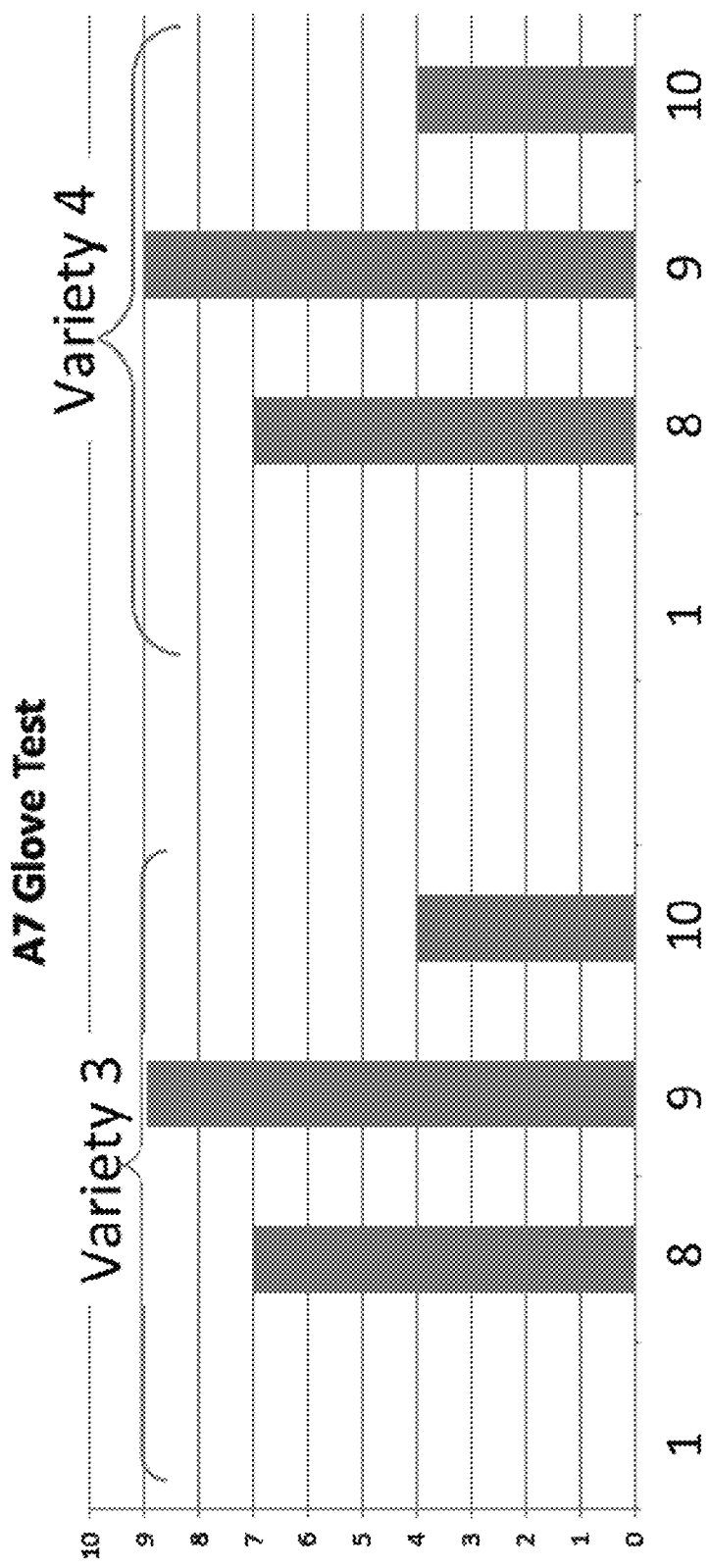

Seed treatments comprising an effect pigment generally produced drier seeds as compared to otherwise similar treatments without an effect pigment. See FIGS. 8A, 8B, and 8C.

Example 9: Flowability Testing for Soybean Seeds Treated with Various Flowability Agents Additional experimental trials were performed on a variety of soybean seeds (Variety 8). The treated seeds were prepared using the procedure set forth in Example 1 above. A description of each seed treatment formulation prepared for this example is provided in Table 9A below. AB refers to AQUABEAD, a vegetable wax and refined paraffin wax emulsion. A582 refers to AQUACER 582, a polyethylene wax. ML160P refers to MICHEM LUBE 160, a carnauba wax emulsion, supplied by Michelman, Inc.

TABLE 9A

Seed Treatments

| Variety | Treatment # | Description |
|---|---|---|
| 8 | 11 | A3 + 2 fl oz (60 mL) AK418 |
| 8 | 13 | A3 + 2 fl oz (60 mL) A582 |
| 8 | 15 | A3 + 2 fl oz (60 mL) ML160P |
| 8 | 17 | A3 + 2 fl oz (60 mL) AB |
| 8 | 28 | UTC |

The treated seeds were then evaluated for flowability using a procedure that measured the time required for 1 kg of seed to flow through a conical funnel. The funnel used to hold the seeds comprised a cylindrical top portion that was 7 inches in diameter and 9 inches tall and a conical bottom portion with sides sloping inward at a 45 degree angle and ending in a 1.75 inch opening at the bottom of the apparatus.

Figure 9:
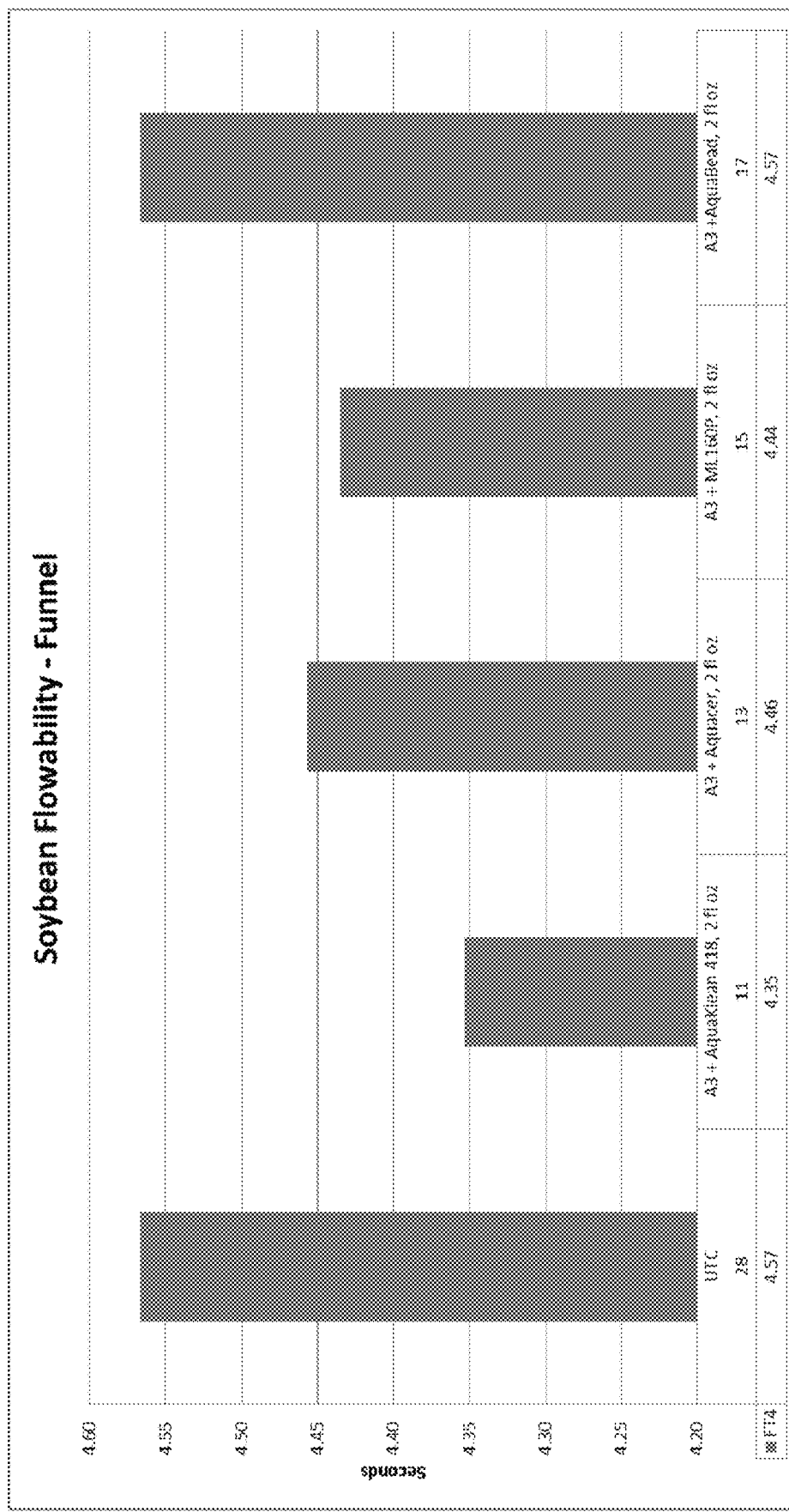
FIG. 9 depicts the flowability of treated seeds measure using the funnel flow procedure described in Example 9.

The time required for 1 kg of seeds to flow through the funnel was recorded with a model 62379-218 VWR Traceable stopwatch. The resulting data are provided in Table 9B below, and are visually depicted in FIG. 9.

TABLE 9B

Flowability

| Treatment # | Seconds |
|---|---|
| 11 | 4.57 |
| 13 | 4.35 |
| 15 | 4.46 |
| 17 | 4.44 |
| 28 | 4.57 |

Example 10: Flowability Testing for Soybean Seeds Treated with Various Flowability Agents Additional experimental trials were performed on a variety of soybean seeds (Variety 6). The treated seeds were prepared using the procedure set forth in Example 1 above. A description of each seed treatment formulation prepared for this example is provided in Table 10A below. X-1798 refers to a polyethylene and vegetable wax emulsion.

TABLE 10A

Seed Treatments

| Treatment # | Treatment description |
|---|---|
| 1 | UTC |
| 2 | A3 |
| 4 | A3 + SM 0.1% |
| 6 | A3 + 1.0 fl oz (30 mL) AK418 + SM 0.1% |
| 9 | A3 + 1.0 fl oz (30 mL) X-1798 + SM 0.1% |
| 21 | UTC |
| 22 | A3 |
| 24 | A3 + SM |
| 26 | A3 + 1 fl oz (30 mL) AK418 + SM |
| 27 | A3 + 0.5 fl oz (15 mL) SO + SM |
| 28 | A3 + 0.5 fl oz SO (15 mL) (+1% boric acid) + SM |

Figure 10A:
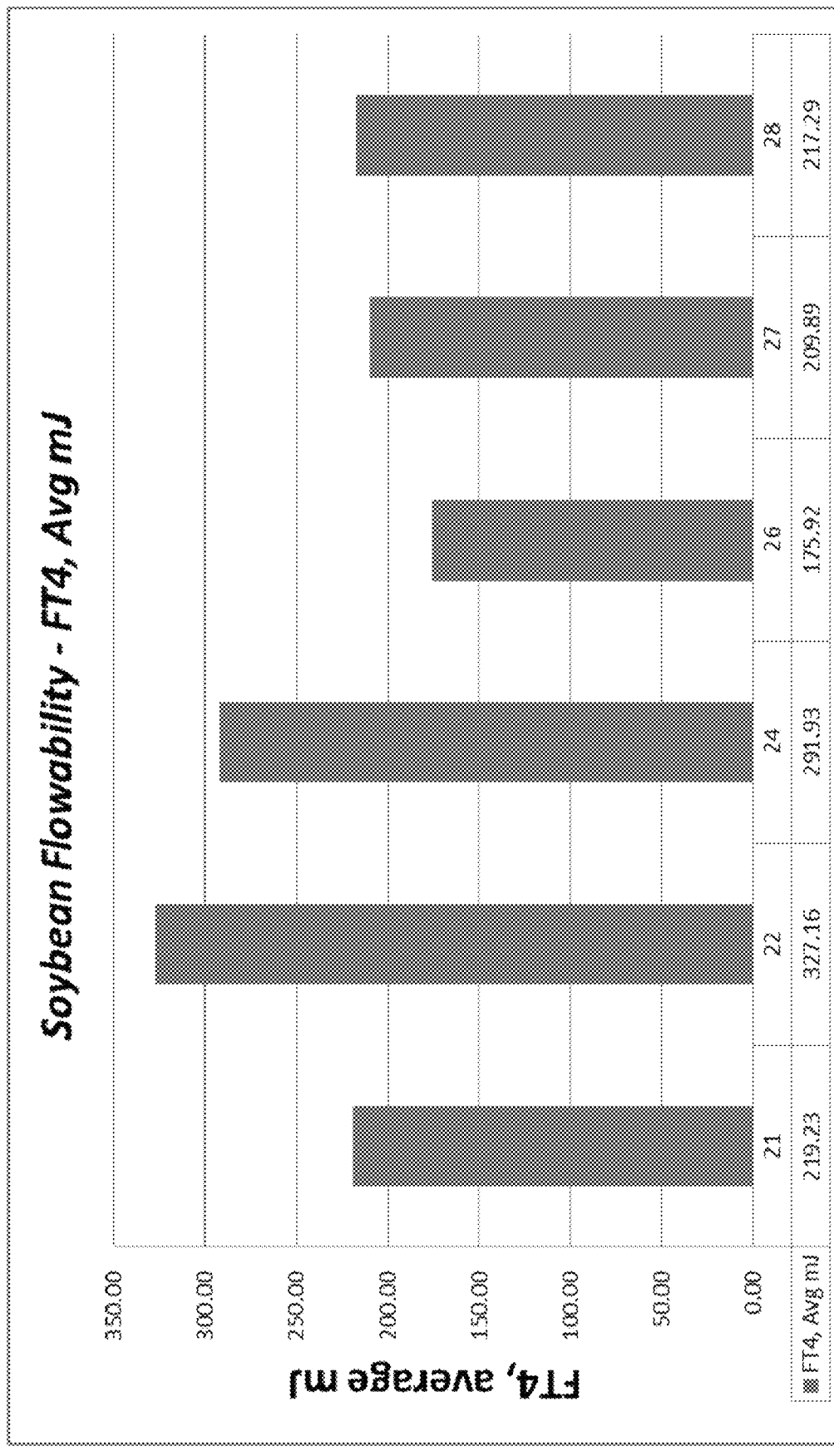
FIGS. 10A and 10B depict the flowability of various treated seeds measured using the FT4 method described in Example 10.
Figure 10B:
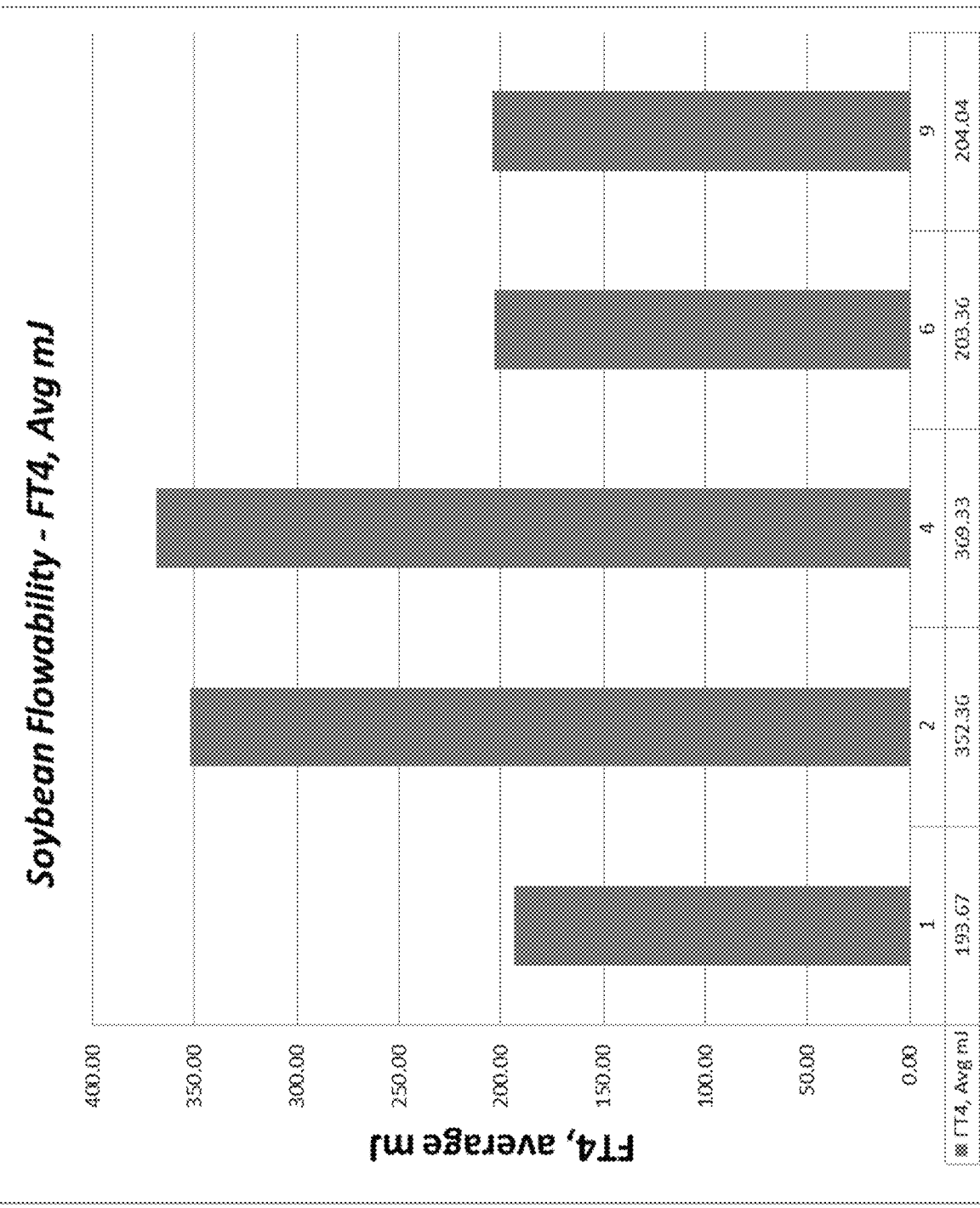

The treated seeds were then evaluated for flowability using the procedure set forth in Example 3 above. The resulting data are provided in Table 10B below, and are visually depicted in FIGS. 10A and 10B.

TABLE 10B

Flowability Test

| Treatment # | BFE (mJ) |
|---|---|
| 1 | 193.67 |
| 2 | 352.36 |
| 4 | 369.33 |
| 6 | 203.36 |
| 9 | 204.04 |
| 21 | 219.23 |
| 22 | 324.16 |
| 24 | 291.93 |
| 26 | 175.92 |
| 27 | 209.89 |
| 28 | 217.29 |

Example 11: Germination Test Methods

Germination studies were performed on four varieties of soybean seeds (Variety 4, Variety 6, Variety 8, and Variety 9) at a field test site in the United States. Four repetitions of 50 soybean seeds each were planted on creped cellulose paper and allowed to germinate. Once the seeds germinated, they were counted for normal or abnormal germination, or seeds that did not germinate, i.e., dead seeds.

Figure 11:
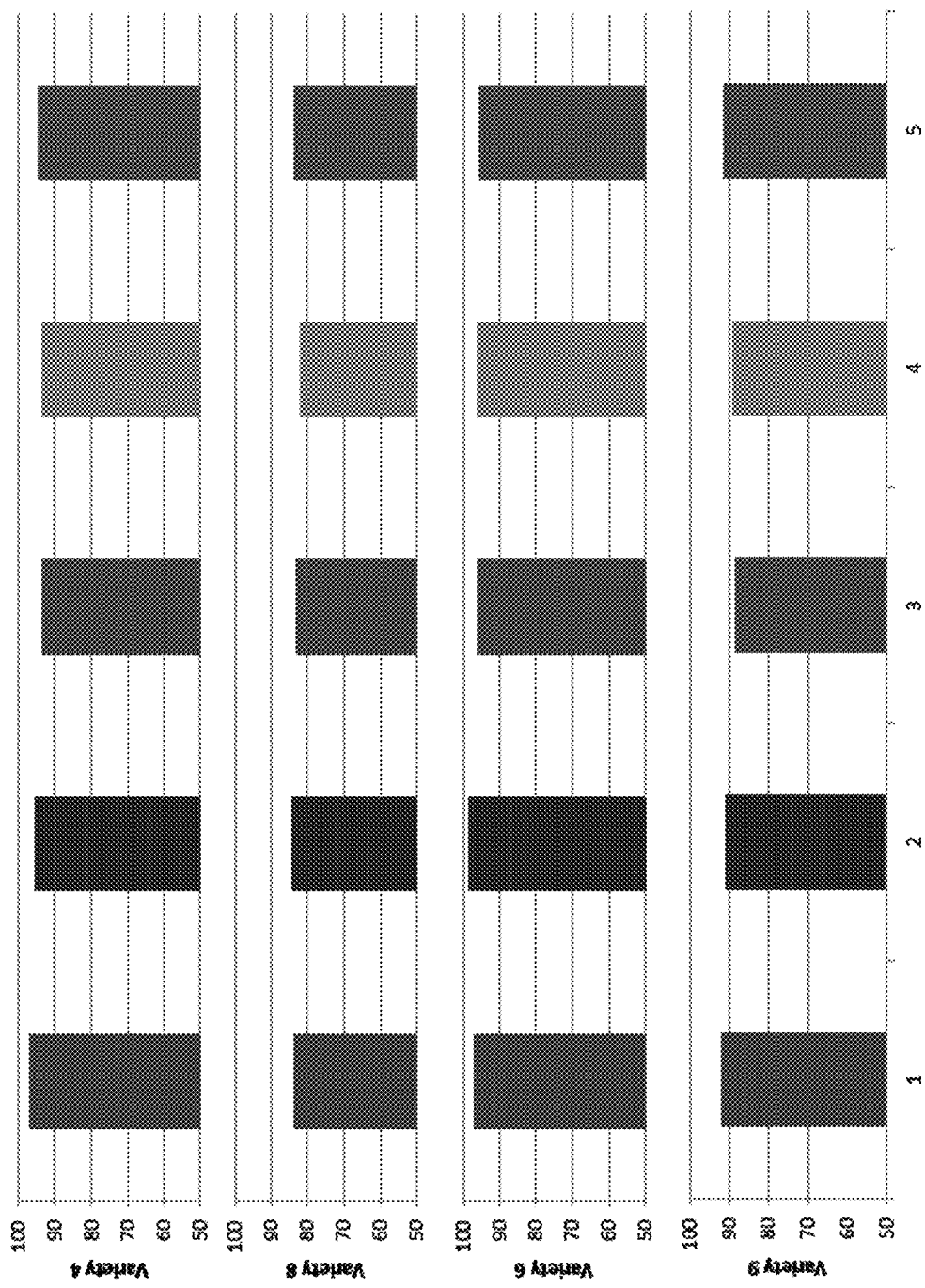
FIG. 11 is a graph of the percentage of treated soybean seeds that successfully germinated after planting, as measured using the procedure described in Example 11.

The treated seeds were prepared using the procedure set forth in Example 1 above. A description of each seed treatment formulation prepared for this example is provided in Table 11A below. The resulting germination data are provided in Table 12B below, and are visually depicted in FIG. 11. The data indicate that the seed treatments comprising a flowability agent and an effect pigment did not have an adverse impact on the germination rate of the seeds.

TABLE 11A

Seed Treatments

| Treatment # | Description |
| --- | --- |
| 1 | UTC |
| 2 | A3 |
| 3 | A3 + SM 0.1% |
| 4 | A3 + 1 fl oz (30 mL) AK418 + SM 0.1% |
| 5 | A3 + 0.5 fl oz (15 mL) SO + SM 0.1% |

TABLE 11B

Summary of Average Germination Percentage

| | Variety | | | |
| --- | --- | --- | --- | --- |
| Treatment # | 6 | 4 | 8 | 9 |
| 1 | 97.25 | 97.00 | 83.75 | 94.75 |
| 2 | 98.50 | 95.50 | 84.25 | 91.25 |
| 3 | 96.25 | 93.50 | 83.25 | 83.25 |
| 4 | 96.00 | 93.50 | 82.25 | 84.50 |
| 5 | 95.50 | 94.75 | 83.75 | 89.75 |

EMBODIMENTS

For further illustration, additional non-limiting embodiments of the present disclosure are set forth below.

For example, embodiment 1 is a method of producing a treated seed, the method comprising:

contacting a seed with a liquid seed treatment composition comprising a flowability agent, thereby producing a wetted seed; and subsequently contacting the wetted seed with a dry powder comprising an effect pigment, thereby producing a treated seed having a coating comprising the effect pigment.

Embodiment 2 is the method of embodiment 1 wherein the liquid seed treatment composition further comprises an agrochemical.

Embodiment 3 is the method of embodiment 2 wherein the liquid seed treatment composition comprises a pesticide.

Embodiment 4 is the method of any one of embodiments 1 to 3 wherein the effect pigment comprises a substrate material and a metal oxide coating.

Embodiment 5 is the method of embodiment 4 wherein the substrate material is hydrophilic.

Embodiment 6 is the method of embodiment 4 wherein the substrate material comprises mica.

Embodiment 7 is the method of any one of embodiments 4 to 6 wherein the metal oxide coating comprises titanium dioxide.

Embodiment 8 is the method of embodiment 7 wherein the effect pigment comprises:

a substrate material comprising mica, and a metal oxide coating comprising titanium dioxide.

Embodiment 9 is the method of any one of embodiments 1 to 3 wherein the effect pigment comprises metal flakes.

Embodiment 10 is the method of any one of embodiments 1 to 9 wherein the liquid seed treatment composition does not comprise an effect pigment.

Embodiment 11 is the method of any one of embodiments 1 to 10 wherein the dry powder further comprises an agrochemical.

Embodiment 12 is the method of embodiment 11 wherein the dry powder comprises a biological agent.

Embodiment 13 is the method of embodiment 12 wherein the dry powder comprises a biological agent selected from the group consisting of bacteria, fungi, beneficial nematodes, and viruses.

Embodiment 14 is the method of embodiment 13 wherein the dry powder comprises a biological agent comprising a bacterium of the genus *Actinomycetes, Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comomonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces Variovax,* or *Xenorhabdus*.

Embodiment 15 is the method of embodiment 13 or 14 wherein the dry powder comprises a biological agent comprising a fungus of the genus *Alternaria, Ampelomyces, Aspergillus, Aureobasidium, Beauveria, Colletotrichum, Coniothyrium, Gliocladium, Metarhisium, Muscodor, Paecilonyces, Penicillium, Trichoderma, Typhula, Uloclatidium,* or *Verticilium*.

Embodiment 16 is the method of any one of embodiments 1 to 15 wherein the flowability agent comprises a wax.

Embodiment 17 is the method of embodiment 16 wherein the flowability agent comprises a wax selected from the group consisting of carnauba wax, candelilla wax, ouricury wax, beeswax, spermaceti, and paraffin wax.

Embodiment 18 is the method of embodiment 17 wherein the flowability agent comprises carnauba wax.

Embodiment 19 is the method of any one of embodiments 1 to 18 wherein the wetted seeds are produced using a continuous process.

Embodiment 20 is the method of embodiment 19 wherein the seed is contacted with the liquid seed treatment composition within a seed treatment apparatus comprising a horizontal cylindrical drum.

Embodiment 21 is the method of embodiment 20 wherein the seed treatment apparatus further comprises a liquid application zone, and wherein the seeds are contacted with the liquid seed treatment composition within the liquid application zone before they enter the horizontal cylindrical drum.

Embodiment 22 is the method of embodiment 21 wherein the liquid application zone comprises a conical mixer.

Embodiment 23 is the method of embodiment 20 wherein the seeds are contacted with the liquid seed treatment composition inside the horizontal cylindrical drum.

Embodiment 24 is the method of any one of embodiments 19 to 23 wherein the dry powder is applied to the wetted seeds inside the horizontal cylindrical drum.

Embodiment 25 is the method of embodiment 24 wherein the dry powder is applied to the wetted seeds using an auger feeder or a vibratory pipe feeder.

Embodiment 26 is the method of embodiment 24 or 25 wherein the wetted seeds are conditioned for a period of from about 5 seconds to about 2 minutes, from about 10 seconds to 1 minute, from about 10 seconds to about 40 seconds, or from about 15 seconds to about 30 seconds before being contacted with the dry powder coating.

Embodiment 27 is the method of any one of embodiments 19 to 26 wherein the residence time of the seeds within the continuous seed treater is from about 30 seconds to about 4 minutes, from about 40 seconds to about 3 minutes, or from about 1 minute to about 2 minutes.

Embodiment 28 is the method of any one of embodiments 1 to 18 wherein the wetted seeds are produced using a batch process.

Embodiment 29 is the method of embodiment 28 wherein the seed is contacted with the liquid seed treatment composition within a seed treatment apparatus comprising a rotating bowl seed treater.

Embodiment 30 is the method of embodiment 29 wherein the dry powder is introduced into the rotating bowl after a conditioning period of from about 2 seconds to about 1 minute, from about 5 seconds to about 30 seconds, or from about 5 seconds to about 20 seconds after the seeds are contacted with the liquid seed treatment composition.

Embodiment 31 is the method of embodiment 29 or 30 wherein the treated seeds are allowed to spin and/or tumble within the rotating bowl for a period of from about 5 seconds to about 60 seconds after being contacted with the dry powder.

Embodiment 32 is the method of any one of embodiments 29 to 31 wherein the total time spent by the seeds within the rotating bowl seed treater is from about 30 seconds to about 2 minutes, from about 45 seconds to about 75 seconds, or about 60 seconds.

Embodiment 33 is the method of any one of embodiments 19 to 32 wherein the process further comprises the use of a drying apparatus to dry the wetted seeds.

Embodiment 34 is the method of embodiment 33 wherein the drying apparatus comprises a tumbling dryer.

Embodiment 35 is the method of embodiment 33 or 34 wherein the wetted seeds are contacted with the dry powder within the drying apparatus.

Embodiment 36 is the method of any one of embodiments 33 to 35 wherein the wetted seeds are transferred from the drying apparatus to a second seed treatment apparatus wherein they are contacted with the dry powder.

Embodiment 37 is the method of embodiment 36 wherein the second seed treatment apparatus comprises a rotating bowl seed treater, or a horizontal drum seed treater.

Embodiment 38 is the method of embodiment 37 wherein the second seed treatment apparatus comprises a horizontal drum seed treater.

Embodiment 39 is the method of any one of embodiments 1 to 38 wherein the seed is contacted with the liquid seed treatment composition for a duration of less than about 2 minutes, less than about 1 minute, less than about 45 seconds, less than about 30 seconds, or less than about 20 seconds.

Embodiment 40 is the method of any one of embodiments 1 to 39 wherein the seed is a corn seed or a soybean seed, and wherein the seed is contacted with the liquid seed treatment composition for an average duration of from about 45 seconds to about 90 seconds.

Embodiment 41 is the method of any one of embodiments 1 to 39 wherein the seed is a cotton seed, and wherein the seed is contacted with the liquid seed treatment composition for an average duration of from about 60 seconds to about 120 seconds.

Embodiment 42 is the method of any one of embodiments 1 to 41 wherein the wetted seed is contacted with the dry powder for a duration of less than about 1 minute, less than about 45 seconds, less than about 30 seconds, or less than about 20 seconds.

Embodiment 43 is the method of any one of embodiments 1 to 42 wherein the wetted seed is contacted with the dry powder for an average duration of from about 20 seconds to about 60 seconds.

Embodiment 44 is the method of any one of embodiments 1 to 43 wherein the flowability agent is applied in an amount of from about 0.2 fluid ounces to about 4 fluid ounces per 100 pounds of seed, or from about 0.5 fluid ounces to about 4 fluid ounces per 100 pounds of seed.

Embodiment 45 is the method of embodiment 44 wherein the seed is a corn seed or a soybean seed and the flowability agent is applied in an amount of from about 0.5 fluid ounces to about 1.5 fluid ounces per 100 pounds of seed.

Embodiment 46 is the method of embodiment 44 wherein the seed is a cotton seed and the flowability agent is applied in an amount of from about 1.5 fluid ounces to about 2.5 fluid ounces per 100 pounds of seed.

Embodiment 47 is the method of any one of embodiments 1 to 46 wherein the dry powder is applied in an amount of from about 0.5 grams to about 5 grams per kilogram of seed.

Embodiment 48 is the method of any one of embodiments 1 to 47 wherein the liquid seed treatment composition is in the form of a slurry comprising an aqueous phase and a dispersed solid phase.

Embodiment 49 is the method of embodiment 48 wherein the liquid seed treatment composition further comprises a co-solvent.

Embodiment 50 is the method of any one of embodiments 1 to 49 wherein the liquid seed treatment composition further comprises a surfactant.

Embodiment 51 is the method of any one of embodiments 1 to 50 wherein the liquid seed treatment composition comprises a pesticide selected from the group consisting of fungicides, insecticides, nematicides, and mixtures thereof.

Embodiment 52 is the method of any one of embodiments 1 to 51 wherein the liquid seed treatment composition comprises a biological agent, microbial extract, plant growth activator, plant defense agent, or a mixture thereof.

Embodiment 53 is the method of embodiment 52 wherein the liquid seed treatment composition comprises a biological agent selected from the group consisting of bacteria, fungi, beneficial nematodes, and viruses.

Embodiment 54 is the method of embodiment 53 wherein the liquid seed treatment composition comprises a biological agent comprising a bacterium of the genus *Actinomycetes, Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comomonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovax,* or *Xenorhabdus.*

Embodiment 55 is the method of embodiment 53 or 54 wherein the liquid seed treatment composition comprises a biological agent comprising a fungus of the genus *Alternaria, Ampelomyces, Aspergillus, Aureobasidium, Beauveria, Colletotrichum, Coniothyrium, Gliocladium, Metarhisium, Muscodor, Paecilonyces, Penicillium, Trichoderma, Typhula, Ulocladium*, or *Verticilium*.

Embodiment 56 is the method of any one of embodiments 53 to 55 wherein the liquid seed treatment composition comprises a biological agent comprising a plant growth activator or plant defense agent selected from the group consisting of harpin, *Reynoutria sachalinensis*, jasmonate, lipochitooligosaccharides, salicylic acid, and isoflavones.

Embodiment 57 is the method of any one of embodiments 1 to 56 wherein the process further comprises contacting the seed with a dry active composition comprising a biological agent.

Embodiment 58 is the method of embodiment 57 wherein the seed is contacted with the dry active composition during the same period in which the seed is contacted with the liquid seed treatment composition.

Embodiment 59 is the method of embodiment 57 or 58 wherein the dry active composition comprises a biological agent selected from the group consisting of bacteria, fungi, beneficial nematodes, and viruses.

Embodiment 60 is the method of embodiment 59 wherein the dry active composition comprises a biological agent comprising a bacterium of the genus *Actinomycetes, Agrobacterium, Arthrobacter, Alcaligenes, Aureobacterium, Azobacter, Bacillus, Beijerinckia, Bradyrhizobium, Brevibacillus, Burkholderia, Chromobacterium, Clostridium, Clavibacter, Comomonas, Corynebacterium, Curtobacterium, Enterobacter, Flavobacterium, Gluconobacter, Hydrogenophaga, Klebsiella, Metarhizium, Methylobacterium, Paenibacillus, Pasteuria, Photorhabdus, Phyllobacterium, Pseudomonas, Rhizobium, Serratia, Sphingobacterium, Stenotrophomonas, Streptomyces, Variovax*, or *Xenorhabdus*.

Embodiment 61 is the method of embodiment 59 or 60 wherein the dry active composition comprises a biological agent comprising a fungus of the genus *Alternaria, Ampelomyces, Aspergillus, Aureobasidium, Beauveria, Colletotrichum, Coniothyrium, Gliocladium, Metarhisium, Muscodor, Paecilonyces, Penicillium, Trichoderma, Typhula, Ulocladium*, or *Verticilium*.

Embodiment 62 is the method of any one of embodiments 59 to 61 wherein the dry active composition comprises a biological agent comprising a plant growth activator or plant defense agent selected from the group consisting of harpin, *Reynoutria sachalinensis*, jasmonate, lipochitooligosaccharides, salicylic acid, and isoflavones.

Embodiment 63 is a treated seed produced according to the method of any one of embodiments 1 to 62.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A method of producing a treated plant seed, the method comprising:
   contacting a plant seed with a liquid seed treatment composition comprising a flowability agent comprising a wax, thereby producing a wet seed, wherein the wax is applied in an amount of from about 0.33 mL to about 2.6 mL per kilogram of seed; and
   subsequently contacting the wet seed with a dry powder comprising an effect pigment, wherein the effect pigment is applied in an amount of from about 0.5 grams to about 5 grams per kilogram of seed, thereby producing a treated seed having a coating comprising the effect pigment.

2. The method of claim 1 wherein the effect pigment comprises a substrate material and a metal oxide coating.

3. The method of claim 1 wherein the effect pigment comprises:
   a substrate material comprising mica, and
   a metal oxide coating comprising titanium dioxide.

4. The method of claim 1 wherein the effect pigment comprises metal flakes.

5. The method of claim 1 wherein the liquid seed treatment composition does not comprise an effect pigment.

6. The method of claim 1 wherein the dry powder further comprises a biological agent.

7. The method of claim 1 wherein the flowability agent comprises a wax selected from the group consisting of carnauba wax, candelilla wax, ouricury wax, beeswax, spermaceti, and paraffin wax.

8. The method of claim 1 wherein the plant seed is contacted with the liquid seed treatment composition within a seed treatment apparatus comprising a horizontal cylindrical drum.

9. The method of claim 8 wherein the seed treatment apparatus further comprises a liquid application zone, and wherein the plant seeds are contacted with the liquid seed treatment composition within the liquid application zone before they enter the horizontal cylindrical drum.

10. The method of claim 1 wherein the plant seed is contacted with the liquid seed treatment composition within a seed treatment apparatus comprising a rotating bowl seed treater.

11. The method of claim 1 wherein the method comprises the use of a drying apparatus to dry the wet seeds.

12. The method of claim 11 wherein the wet seeds are contacted with the dry powder within the drying apparatus.

13. The method of claim 11 wherein the wet seeds are transferred from the drying apparatus to a second seed treatment apparatus wherein they are contacted with the dry powder.

14. The method of claim 1 wherein the plant seed is a corn seed or a soybean seed and the flowability agent is applied in an amount of from about 0.33 mL to about 0.97 mL per kilogram of seeds.

15. The method of claim 1 wherein the plant seed is a cotton seed and the flowability agent is applied in an amount of from about 0.97 mL to about 1.6 mL per kilogram of seeds.

16. The method of claim 1 wherein the plant seed is contacted with the liquid seed treatment composition and the wet seed is contacted with the dry powder within a seed treatment apparatus comprising a rotating bowl seed treater and the wet seed is contacted with the dry powder from about 5 seconds to about 30 seconds after contacting the plant seed with the liquid seed treatment composition.

17. The method of claim 1 wherein the plant seed is contacted with the liquid seed treatment composition and the wet seed is contacted with the dry powder within a seed treatment apparatus comprising a horizontal cylindrical drum seed treater and the wet seed is contacted with the dry powder from about 10 seconds to 1 minute after contacting the plant seed with the liquid seed treatment composition.

18. The method of claim 1 wherein the liquid seed treatment composition further comprises one or more agrochemicals selected from the group consisting of pesticides, biological agents, microbial extracts, plant growth activators, and plant defense agents.

* * * * *